US006990779B2

(12) United States Patent
Kiik et al.

(10) Patent No.: US 6,990,779 B2
(45) Date of Patent: Jan. 31, 2006

(54) ROOFING SYSTEM AND ROOFING SHINGLES

(75) Inventors: Matti Kiik, Richardson, TX (US); Allen Mclintock, Grapevine, TX (US); Michael Bryson, Blue Springs, MO (US); Kevin L. Beattie, Plano, TX (US)

(73) Assignee: Elk Premium Building Products, Inc., Dallas, TX (US)

( * ) Notice: Subject to any disclaimer, the term of this patent is extended or adjusted under 35 U.S.C. 154(b) by 38 days.

(21) Appl. No.: 10/212,012

(22) Filed: Aug. 2, 2002

(65) Prior Publication Data

US 2003/0040241 A1 Feb. 27, 2003

Related U.S. Application Data

(63) Continuation-in-part of application No. 10/211,663, filed on Aug. 2, 2002, now Pat. No. 6,708,456, which is a continuation-in-part of application No. 09/897,308, filed on Jul. 2, 2001, now Pat. No. 6,673,432, which is a continuation-in-part of application No. 09/663,255, filed on Sep. 15, 2000, now Pat. No. 6,586,353.

(60) Provisional application No. 60/331,808, filed on Nov. 20, 2001, provisional application No. 60/310,031, filed on Aug. 3, 2001, provisional application No. 60/168,057, filed on Nov. 30, 1999.

(51) Int. Cl.
*E04D 1/00* (2006.01)

(52) U.S. Cl. .............................. 52/554; 52/555; 52/557; 52/518; 52/314; 52/315

(58) Field of Classification Search .................. 52/314, 52/315, 518, 554, 555, 557
See application file for complete search history.

(56) References Cited

U.S. PATENT DOCUMENTS

| 74,606 A | 2/1868 | Schanck |
| 79,645 A | 7/1868 | Ferguson |
| 83,539 A | 10/1868 | Pinner |

(Continued)

FOREIGN PATENT DOCUMENTS

DE 289082 4/1991

(Continued)

OTHER PUBLICATIONS

Correspondence from Elk Corporation to Fontana Paper Mill dated Jul. 30, 1999 and Aug. 19, 1999, including a copy of the Confidentiality Agreement executed between these two parties covering three samples supplied by Elk to Fontana Paper Mill for confidential evaluation.

(Continued)

*Primary Examiner*—Jeanette E. Chapman
(74) *Attorney, Agent, or Firm*—Baker Botts LLP

(57) ABSTRACT

A roofing system having a multiplicity of courses of roofing shingles and interply material having at least one course of interply material overlapping at least about ten percent of a first course of shingles and a second course of shingles overlapping at least a portion of the interply material and the first course of shingles. More than about 40% of the first course of shingles is exposed after installation. The roofing system has a class A fire resistant rating. Roofing shingles having particular utility in the roofing system of the present invention are also disclosed. In preferred embodiments the shingles have an exposure width of at least about 60% of the shingle, more preferably at least about 64% of the width of the shingle.

71 Claims, 9 Drawing Sheets

U.S. PATENT DOCUMENTS

| | | | |
|---|---|---|---|
| 1,447,290 A | 3/1923 | Fischer | |
| 1,601,731 A | 10/1926 | Flood | |
| 1,619,600 A | 3/1927 | Cumper | |
| 1,722,702 A | 7/1929 | Kirschbraun et al. | |
| 1,898,989 A * | 2/1933 | Harshberger | 52/748.1 |
| 2,097,845 A | 11/1937 | Snow | |
| 2,160,845 A | 6/1939 | Eason | |
| 2,182,526 A * | 12/1939 | Rumer | 52/548 |
| 2,305,008 A | 12/1942 | Howard | |
| 3,603,221 A | 9/1971 | Barton et al. | |
| 3,616,173 A | 10/1971 | Green et al. | |
| 3,624,975 A | 12/1971 | Morgan et al. | |
| 3,634,293 A | 1/1972 | Bonitz | |
| 3,665,667 A | 5/1972 | Oberley et al. | |
| 3,721,578 A | 3/1973 | Bennett et al. | |
| 3,763,609 A * | 10/1973 | Probst | 52/105 |
| 3,841,885 A | 10/1974 | Jakel | |
| 3,921,358 A | 11/1975 | Bettoli | |
| 3,954,555 A | 5/1976 | Kole et al. | |
| 3,992,340 A | 11/1976 | Bonitz | |
| 4,044,188 A | 8/1977 | Segal | |
| 4,073,997 A | 2/1978 | Richards et al. | |
| 4,079,158 A | 3/1978 | Kennepohl et al. | |
| 4,082,885 A | 4/1978 | Rashid et al. | |
| 4,130,516 A | 12/1978 | Gagle et al. | |
| 4,135,022 A | 1/1979 | Kennepohl et al. | |
| 4,186,236 A | 1/1980 | Heitmann | |
| 4,212,912 A | 7/1980 | Wartusch et al. | |
| 4,212,913 A | 7/1980 | Auten | |
| 4,214,032 A | 7/1980 | Cskiós et al. | |
| 4,229,329 A | 10/1980 | Bennett | |
| 4,265,962 A | 5/1981 | May | |
| 4,273,685 A | 6/1981 | Marzocchi et al. | |
| 4,291,086 A | 9/1981 | Auten | |
| 4,306,911 A | 12/1981 | Gordon et al. | |
| 4,313,968 A | 2/1982 | Sickles et al. | |
| 4,331,726 A | 5/1982 | Cleary | |
| 4,332,705 A | 6/1982 | Uffner | |
| 4,388,366 A | 6/1983 | Rosato et al. | |
| 4,399,186 A | 8/1983 | Lauderback | |
| 4,405,680 A | 9/1983 | Hansen | |
| 4,460,737 A | 7/1984 | Evans et al. | |
| 4,468,430 A | 8/1984 | Ruede | |
| 4,472,243 A | 9/1984 | Bondoc et al. | |
| 4,473,610 A | 9/1984 | Davis | |
| 4,478,610 A | 10/1984 | Parekh et al. | |
| 4,506,060 A | 3/1985 | White, Sr. et al. | |
| 4,513,045 A | 4/1985 | Bondoc et al. | |
| 4,521,478 A | 6/1985 | Hageman | |
| 4,541,217 A | 9/1985 | Stewart | |
| 4,555,543 A | 11/1985 | Effenberger et al. | |
| 4,559,267 A | 12/1985 | Freshwater et al. | |
| 4,560,612 A | 12/1985 | Yau | |
| 4,571,356 A | 2/1986 | White, Sr. et al. | |
| 4,599,258 A | 7/1986 | Hageman | |
| 4,609,709 A | 9/1986 | Yau | |
| 4,610,918 A | 9/1986 | Effenberger et al. | |
| 4,612,238 A | 9/1986 | DellaVecchia et al. | |
| 4,647,496 A | 3/1987 | Lehnert et al. | |
| 4,654,235 A | 3/1987 | Effenberger et al. | |
| 4,664,707 A | 5/1987 | Wilson et al. | |
| 4,669,246 A | 6/1987 | Freeman | |
| 4,683,165 A | 7/1987 | Lindemann et al. | |
| 4,717,614 A | 1/1988 | Bondoc et al. | |
| 4,738,884 A | 4/1988 | Algrim et al. | |
| 4,745,032 A | 5/1988 | Morrison | |
| 4,746,560 A | 5/1988 | Goeden | |
| 4,746,565 A | 5/1988 | Bafford et al. | |
| 4,755,545 A | 7/1988 | Lalwani | |
| 4,764,420 A | 8/1988 | Gluck et al. | |
| 4,784,897 A | 11/1988 | Brands et al. | |
| 4,810,569 A | 3/1989 | Lehnert et al. | |
| 4,835,004 A | 5/1989 | Kawanishi | |
| 4,837,095 A | 6/1989 | Hageman | |
| 4,870,796 A | 10/1989 | Hart et al. | |
| 4,879,173 A | 11/1989 | Randall | |
| 4,889,880 A | 12/1989 | Miller | |
| 4,917,764 A | 4/1990 | Lalwani et al. | |
| D309,027 S | 7/1990 | Noone et al. | |
| 4,944,818 A | 7/1990 | Dybsky et al. | |
| 5,001,005 A | 3/1991 | Blanpied | |
| 5,015,711 A | 5/1991 | Simonet et al. | |
| 5,019,610 A | 5/1991 | Sitz et al. | |
| 5,030,507 A | 7/1991 | Mudge et al. | |
| 5,091,243 A | 2/1992 | Tolbert et al. | |
| 5,099,627 A | 3/1992 | Coulton et al. | |
| 5,110,839 A | 5/1992 | Chao | |
| 5,112,678 A | 5/1992 | Gay et al. | |
| 5,148,645 A | 9/1992 | Lehnert et al. | |
| 5,192,366 A | 3/1993 | Nishioka et al. | |
| 5,220,762 A | 6/1993 | Lehnert et al. | |
| 5,232,530 A | 8/1993 | Malmquist et al. | |
| 5,239,802 A | 8/1993 | Robinson | |
| 5,318,844 A | 6/1994 | Brandon | |
| 5,334,648 A | 8/1994 | Drews et al. | |
| 5,342,680 A | 8/1994 | Randall | |
| 5,347,785 A | 9/1994 | Terrenzio et al. | |
| 5,369,929 A | 12/1994 | Weaver et al. | |
| 5,371,989 A | 12/1994 | Lehnert et al. | |
| 5,391,417 A | 2/1995 | Pike | |
| 5,393,794 A | 2/1995 | Sperber | |
| 5,397,631 A | 3/1995 | Green et al. | |
| 5,401,588 A | 3/1995 | Garvey et al. | |
| 5,437,717 A | 8/1995 | Doyle et al. | |
| 5,437,923 A | 8/1995 | Kalkanoglu | |
| 5,445,878 A | 8/1995 | Mirous | |
| 5,476,542 A | 12/1995 | Doyle et al. | |
| 5,496,400 A | 3/1996 | Doyle et al. | |
| 5,501,730 A | 3/1996 | Duong et al. | |
| D369,421 S | 4/1996 | Kiik et al. | |
| 5,518,586 A | 5/1996 | Mirous | |
| 5,573,586 A | 11/1996 | Yap et al. | |
| 5,580,376 A | 12/1996 | Hayner | |
| 5,580,378 A | 12/1996 | Shulman | |
| 5,601,680 A | 2/1997 | Kuszaj et al. | |
| 5,601,888 A | 2/1997 | Fowler | |
| 5,604,274 A | 2/1997 | Gallagher et al. | |
| 5,611,186 A | 3/1997 | Weaver | |
| 5,665,442 A | 9/1997 | Andersen et al. | |
| 5,666,776 A | 9/1997 | Weaver et al. | |
| 5,687,517 A | 11/1997 | Wiercinski et al. | |
| 5,698,304 A | 12/1997 | Brandon et al. | |
| 5,717,012 A | 2/1998 | Bondoc et al. | |
| 5,718,785 A | 2/1998 | Randall | |
| 5,776,841 A | 7/1998 | Bondoc et al. | |
| 5,784,845 A | 7/1998 | Imeokparia et al. | |
| 5,795,380 A | 8/1998 | Billings et al. | |
| 5,822,943 A | 10/1998 | Frankoski et al. | |
| 5,884,446 A | 3/1999 | Hageman | |
| 5,965,257 A | 10/1999 | Ahluwalia | |
| 6,014,847 A | 1/2000 | Phillips | |
| 6,067,766 A * | 5/2000 | Badke | 52/518 |
| 6,145,265 A | 11/2000 | Malarkey et al. | |
| 6,148,578 A | 11/2000 | Nowacek et al. | |
| 6,151,859 A | 11/2000 | Nowacek | |
| 6,190,754 B1 * | 2/2001 | Bondoc et al. | 428/143 |
| 6,289,648 B1 | 9/2001 | Freshwater et al. | |
| 6,467,235 B2 * | 10/2002 | Kalkanoglu et al. | 52/45.19 |
| 6,586,353 B1 * | 7/2003 | Kiik et al. | 442/320 |
| 6,673,432 B2 * | 1/2004 | Kiik et al. | 428/301.1 |

FOREIGN PATENT DOCUMENTS

| | | |
|---|---|---|
| DE | 19729533 | 1/1999 |

| | | |
|---|---|---|
| EP | 0316655 | 5/1971 |
| EP | 764748 | 3/1997 |
| GB | 926749 | 5/1963 |
| GB | 1228592 | 5/1971 |
| GB | 2167060 | 5/1986 |
| RU | 564374 | 7/1997 |
| WO | PCT US 8701474 | 1/1988 |
| WO | 9900338 | 1/1999 |
| WO | 0163986 | 8/2001 |

OTHER PUBLICATIONS

Product description for Tough-Guard® Roof Eave and Valley Protector reprinted from the Georgia-Pacific Web site, the URL of which is http://www.gp.com/roofing/pdf/041700.pdf.

U.S. Appl. No. 09/401,392: Freshwater et al., filed Sep. 22, 1999.

U.S. Appl. No. 09/663,255: Kiik et al., filed Sep. 15, 2000.

U.S. Appl. No. 09/897,308: Kiik et al., filed Jul. 2, 2001.

"Ce-DUR™ Shake Installation Guide" excerpt describing Ce-DUR Shake Roof Application.

"Using DURATHON to re-engineer the residential roofing industry" by ENDUR-ALL Technologies, Inc.

* cited by examiner

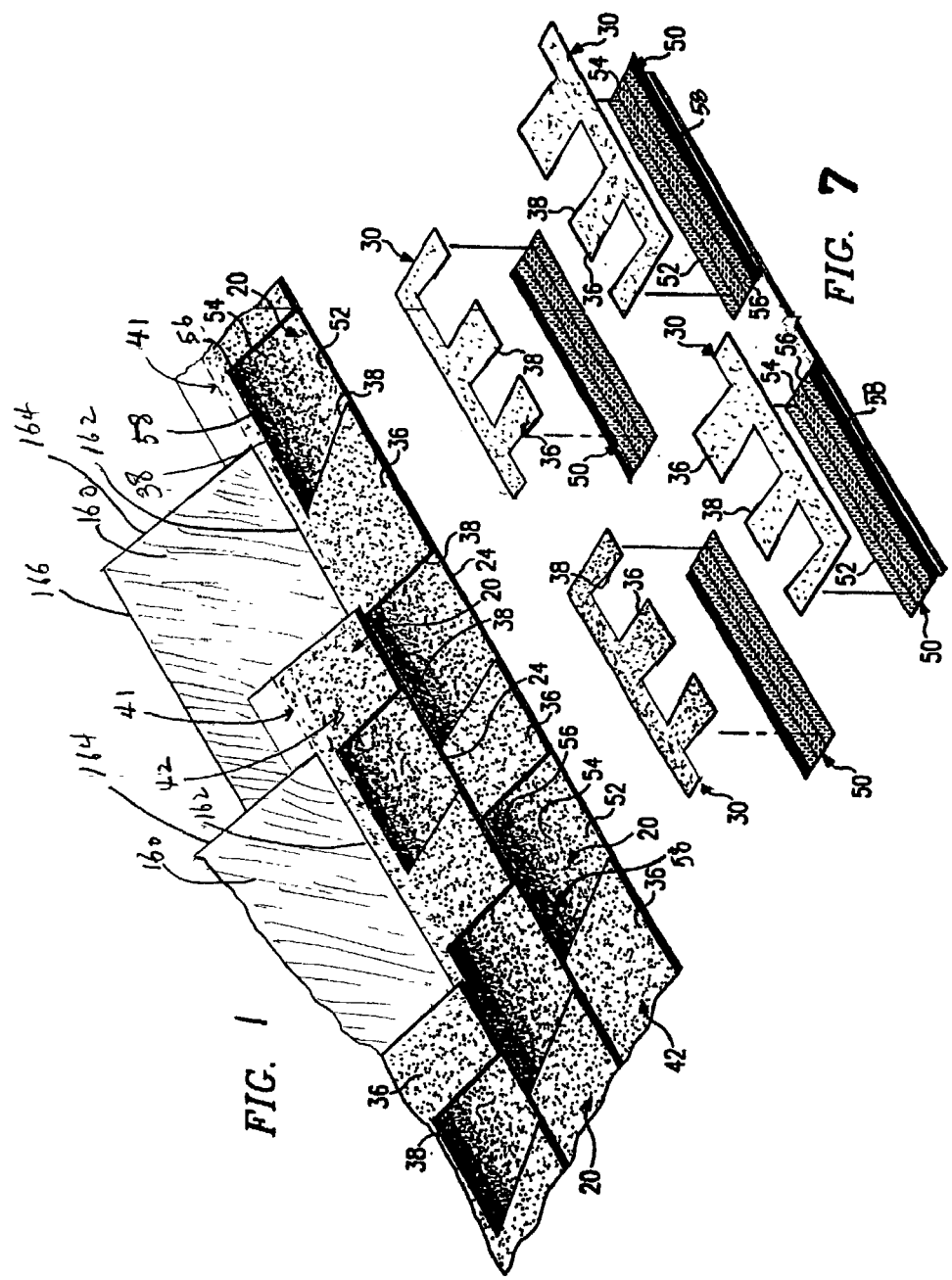

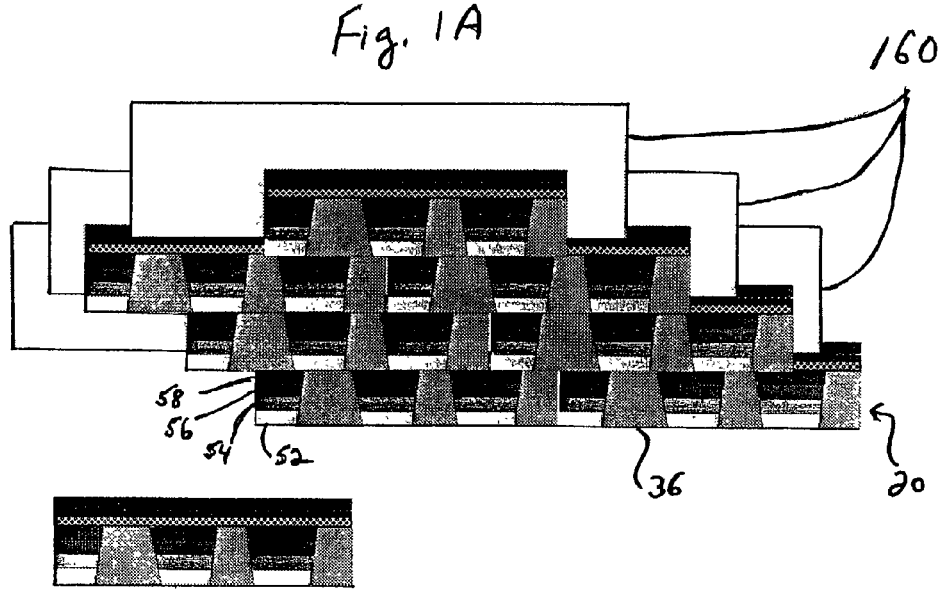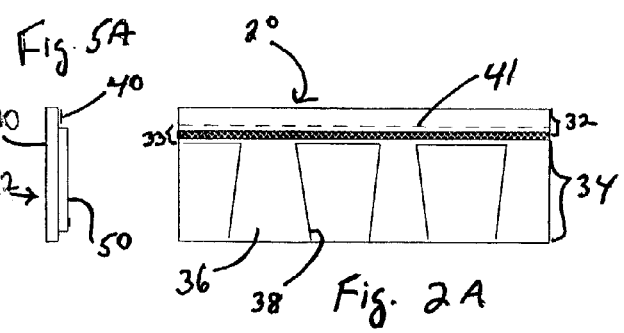

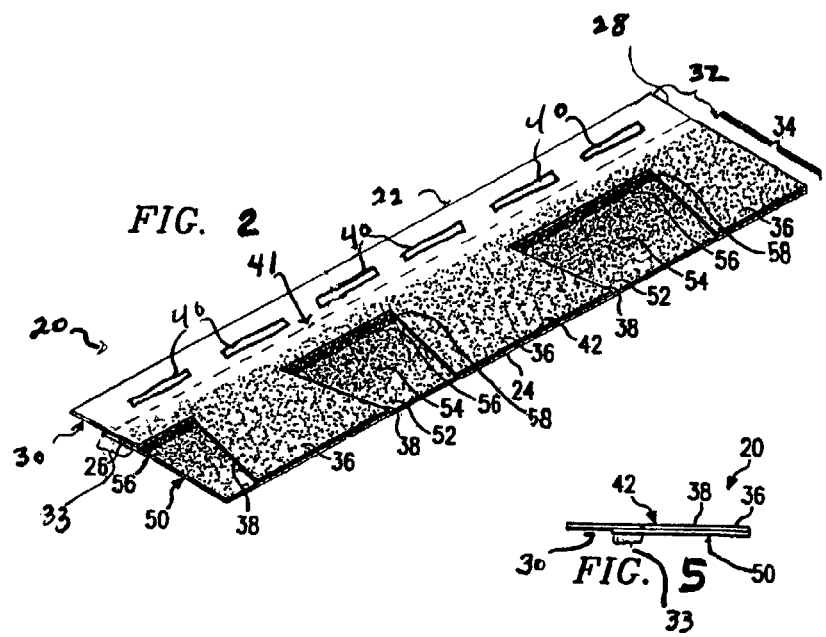
FIG. 2
FIG. 5
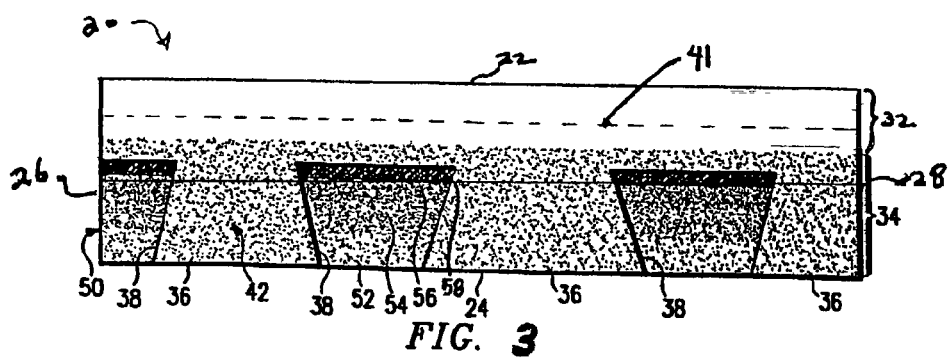
FIG. 3
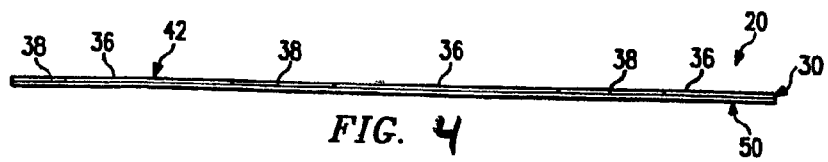
FIG. 4

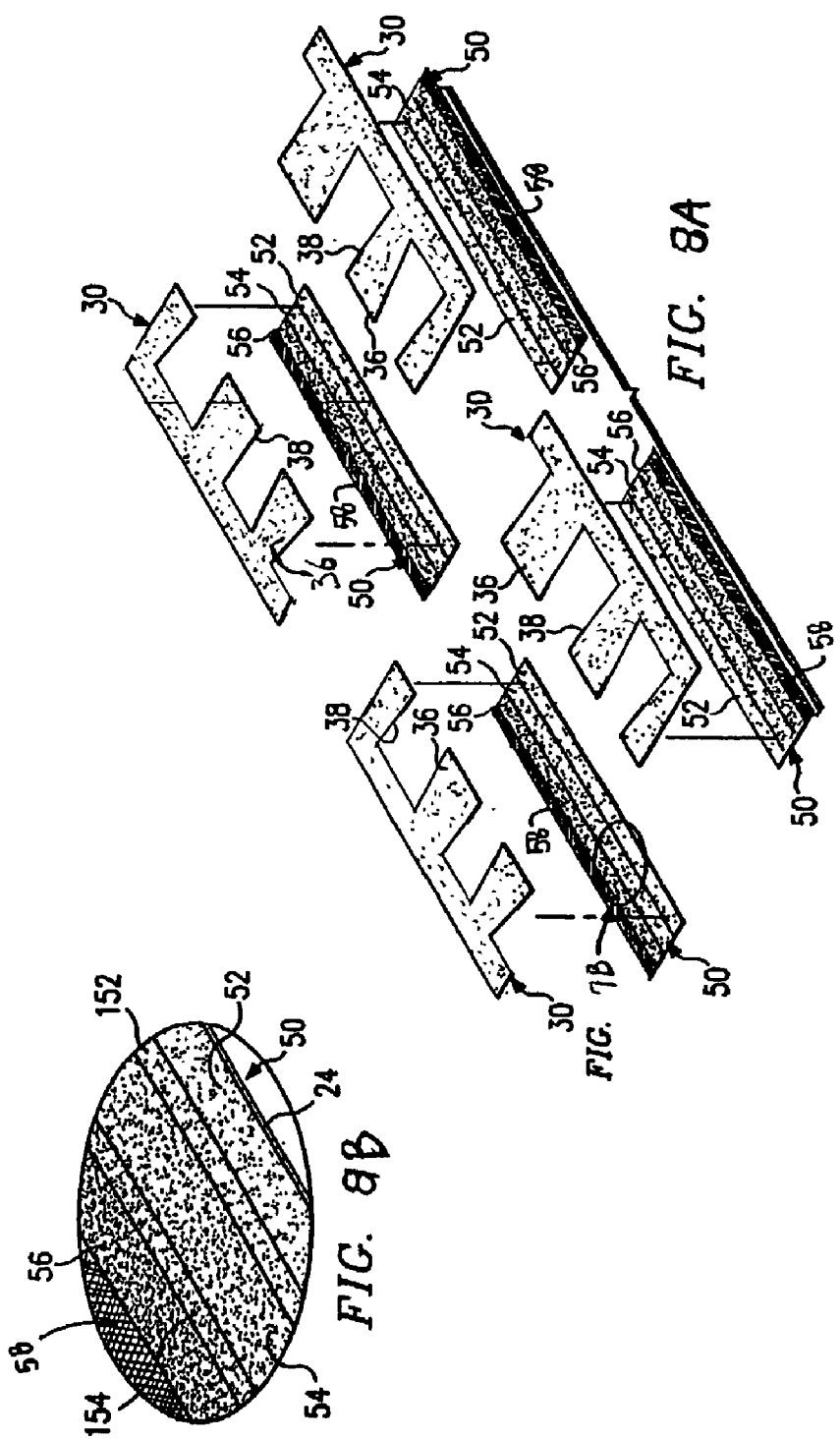

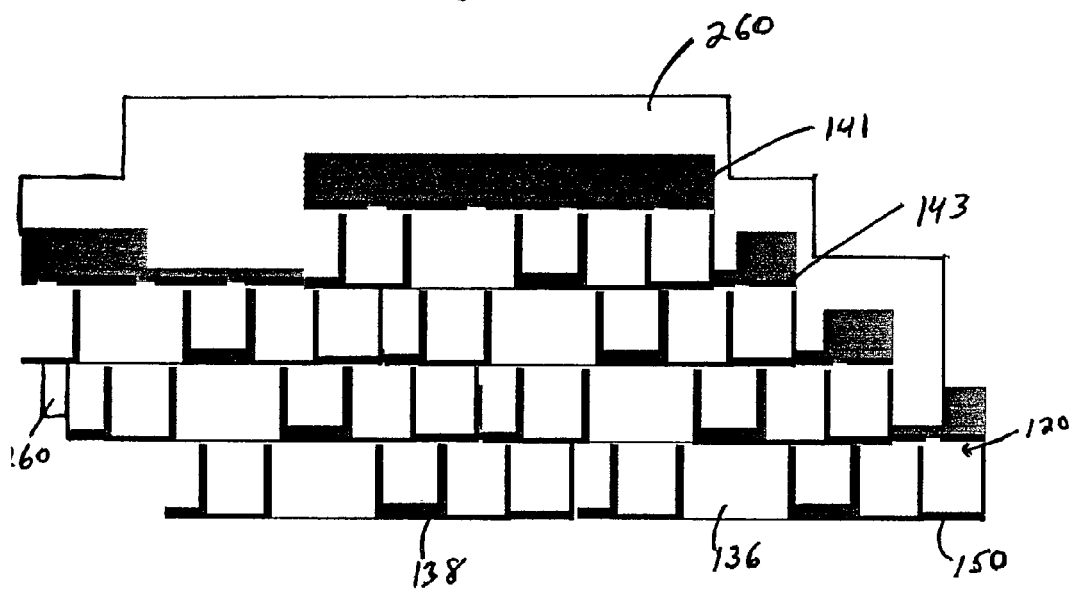
Fig. 9
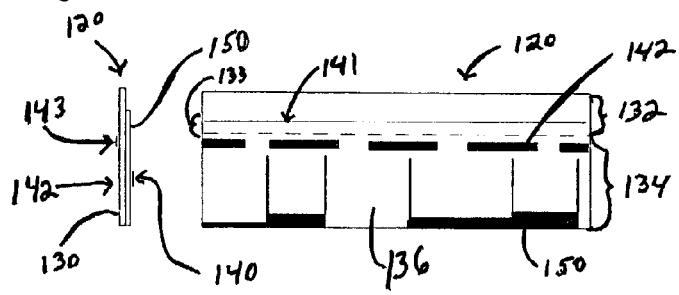
Fig. 11
Fig. 10

ROOFING SYSTEM AND ROOFING SHINGLES

CROSS REFERENCE TO RELATED APPLICATIONS

This application is a continuation-in-part of U.S. Patent application Ser. No. 09/663,255, filed on Sep. 15, 2000 now U.S. Pat. No. 6,586,353, which claims priority under 35 U.S.C. §119(e) to Provisional Patent Application No. 60/168,057, filed on Nov. 30, 1999; a continuation-in-part of U.S. patent application Ser. No. 09/897,308, filed on Jul. 2, 2001 now U.S. Pat. No. 6,673,432; and a continuation-in-part of U.S. patent application Ser. No. 10/211,663, filed Aug. 2, 2002 now U.S. Pat. No. 6,708,456, which claims priority under 35 U.S.C. §119(e) to Provisional Patent Application No. 60/331,808, filed on Nov. 20, 2001. This application also claims priority under 35 U.S.C. §119(e) to Provisional Patent Application No. 60/310,031, filed on Aug. 3, 2001.

TECHNICAL FIELD OF THE INVENTION

The present invention relates generally to a roofing system and to roofing shingles that may be utilized in the roofing system. In particular, the invention relates to the construction of roofing shingles featuring unique combinations of dimensions and a roofing system that utilizes the shingles.

BACKGROUND

Roofing products are often divided into three broad groups: shingles, roll roofing and underlayment. Shingles and roll roofing typically function as outer roof coverings designed to withstand exposure to weather and the elements. Asphalt shingles and roll roofing generally contain the same basic components which provide protection and long term wear associated with asphalt roofing products. Typically, the underlayment is first laid on top of the roof, and then the outer roofing covering (e.g., shingles or roll roofing) is installed on top of the underlayment.

Asphalt shingles (sometimes also referred to as composite shingles) are one of the most commonly used roofing materials. Asphalt shingles may include an organic felt or fiberglass mat base on which an asphalt coating is applied. The organic felt or fiberglass mat base gives the asphalt shingle the strength to withstand manufacturing, handling, installation and servicing activities, and the asphalt coating provides resistance to weathering and stability under temperature extremes. An outer layer of mineral granules is also commonly applied to the asphalt coating to form a weather surface which shields the asphalt coating from the sun's rays, adds color to the final product, and provides additional fire resistance.

Asphalt shingles are typically manufactured as strip or three tab shingles, laminated shingles, interlocking shingles, and large individual shingles in a variety of weights and colors. Even though asphalt shingles offer significant cost, service life, and fire resistance advantages over wood shingles, wood shingles are sometimes preferred due to their pleasing aesthetic features, such as their greater thickness as compared to asphalt shingles, which may result in a more pleasing, layered look for a roof.

Various asphalt shingles have been developed to provide an appearance of thickness comparable to wood shingles. Examples of such asphalt shingles are shown in U.S. Pat. No. 5,232,530 entitled "Method of Making a Thick Shingle"; U.S. Pat. No. 3,921,358 entitled "Composite Shingle"; U.S. Pat. No. 4,717,614 entitled "Asphalt Shingle"; and U.S. Pat. Des. No. D309,027 entitled "Tab Portion of a Shingle." Some laminated asphalt shingles simulate the appearance of slate roofing shingles. See U.S. Pat. No. Des. 369,421. Each of the patents mentioned in this paragraph is incorporated by reference herein in its entirety.

In addition to these patents, significant improvements in the art of roofing shingles have been disclosed and patented in U.S. Pat. Nos. 5,369,929; 5,611,186; and 5,666,776; each entitled "Laminated Roofing Shingle", issued to Weaver et al. and assigned to the Elk Corporation of Dallas. These patents disclose laminated roofing shingles developed to create the illusion of thickness or depth on a relatively flat surface by including a backer strip having striations of color beneath and between tabs wherein the color is uniform within the tab. Each of these three patents is also incorporated by reference herein in its entirety.

Additional improvements include the use of larger shingles having a buttlap section of greater than about 7 inches to provide a more pleasing appearance and a greater visual impact by providing enhanced dimensionality, as disclosed in pending U.S. patent application Ser. No. 09/401,392 entitled "Laminated Roofing Shingle" and filed on Sep. 22, 1999, which is incorporated herein by reference in its entirety. Shingles typically have a buttlap section, a part of which is exposed to the environment, and a headlap section, which is covered by the buttlap section of the shingle in the next row above. The headlap section is typically wide in order to (i) improve weatherproofing, (ii) insure that a majority of the roof is covered by at least one layer of buttlap section and at least one layer of headlap section, and (iii) aid in the production and handling of the shingle. Accordingly, heretofore the production of shingles having a greater exposure area (e.g., having a buttlap section of greater than 7 inches) has required retooling of existing machinery because standard equipment typically produces a shingle having a width of about 13.25 inches. The present invention enables the production on existing equipment lines of a variety of roofing shingles providing for enhanced exposure while still ensuring Class A fire resistance ratings.

SUMMARY OF THE INVENTION

The present invention is a roofing system having a multiplicity of courses of roofing shingles and interply material comprising at least one course of interply material overlapping at least about 10% of a first course of shingles. A second course of shingles overlaps at least a portion of the interply material and the first course of shingles such that more than about 40% of the first course of shingles is exposed after installation. The roofing system has a class A fire resistance rating. The present invention also includes the roofing shingles that may be utilized in the inventive roofing system. Such shingles may be asphalt roofing shingles. For any of the shingles, the width of the shingle is at least about 20% of the shingle's length. The asphalt shingles may be three tab shingles or laminated shingles.

In roofing systems of the present invention featuring laminated shingles, the shingles comprise first and second shingle sheets. The first shingle sheet has a headlap section and a buttlap section including a plurality of tabs which are spaced apart to define one or more openings between the tabs. Each of the tabs has a relatively uniform color throughout the tab. The width of the buttlap section is at least about 40% of the width of the shingle. The second shingle sheet is attached to the underside of the first shingle sheet and has portions exposed through the openings between the tabs. The second shingle sheet has at least first, second, and third horizontal striations thereon across at least partial portions of the second sheet which are exposed through the openings between the tabs. The striations comprise elongated quadrilateral areas. The striations provide a color gradation on at least partial portions of the second sheet which are exposed through the openings between the tabs. In another embodiment, a fourth horizontal striation is across at least partial portions of the second sheet which are exposed through the openings between the tabs. Again, the striations provide a color gradation on at least the partial portions of the second sheet which are exposed through the openings between the tabs.

The width of each of the striations on the second shingle sheet of each shingle may be approximately equal. In embodiments having three striations on the second sheet, the widths of the first and third striations may be approximately equal and approximately one-half the width of the second striation. Alternatively, the widths of the first and third striations may be approximately equal and substantially wider than the width of the second striation. Further, the third striation may be substantially wider than the second striation and the first striation may be approximately twice the width of the third striation.

In the roofing system of the present invention, shingles in each course bearing three striations of approximately equal width may be placed adjacent to shingles wherein the widths of the first and third striations are approximately equal and are approximately one-half the width of the second striation. Alternatively, shingles in each course bearing three striations of approximately equal width may be placed adjacent to shingles wherein the widths of the first and third striations are approximately equal and are substantially wider than the width of the second striation. Additionally, shingles in each course bearing three striations of approximately equal width may be placed adjacent to shingles wherein the third striation is substantially wider than the second striation and the first striation is approximately twice the width of the third striation.

Further, shingles in each course bearing four striations of approximately equal width may be placed adjacent to shingles bearing three striations wherein the widths of the first and third striations are approximately equal and are approximately one-half the width of the second striation. Moreover, shingles in each course bearing four striations of approximately equal width may be placed adjacent to shingles bearing three striations wherein the widths of the first and third striations are approximately equal and are wider than the width of the second striation. Also, shingles in each course bearing four striations of approximately equal width may be placed adjacent to shingles bearing three striations wherein the third striation is substantially wider than the second striation and the first striation is approximately twice the width of the third striation.

In all of the aforementioned laminated shingle embodiments, each of the tabs on the first shingle sheet of each shingle may have a different color contrast from one another. Additionally, the dimensions of one of the tabs on the first shingle sheet of each shingle may differ from the dimensions of others of the tabs. Each shingle may further comprise an interply alignment line positioned horizontally across the headlap section of the shingle. The interply alignment line may be positioned horizontally across a common bonding region of the shingle.

Each laminated shingle as described above may further comprise a transition stripe disposed between a pair of horizontal striations having a color value comprising a mixture of the colors associated with the pair of horizontal striations. The mixture of the colors may include from about 25% to 75% of the color value of each of the pair of horizontal striations.

The width of the buttlap section of each shingle in the roofing system described above may be at least about 70% of the width of the shingle while the interply material may have a width of at least about 100% of the width of the roofing shingle. Alternatively, the width of the buttlap section of each such shingle may be at least about 80% of width of the roofing shingle while the interply material may have a width of from about 105% to about 130% of the width of the roofing shingle.

Each shingle of the roofing system described above may have an exposure width of at least about 60% of the width of the shingle while the interply material has a width of at least about 100% of the width of the shingle. Alternatively, each such shingle may have an exposure width of at least about 64% of the width of the shingle while the interply material has a width of from about 105% to about 130% of the width of the shingle.

The roofing system of the present invention may alternatively include laminated shingles comprising a first shingle sheet having a headlap section and a buttlap section including a plurality of tabs which are spaced apart to define one or more openings between the tabs. Each of the tabs has a relatively uniform color throughout the tab. The width of the buttlap section may be at least about 40% of the width of the shingle. The shingle also includes a second shingle sheet attached to the underside of the first shingle sheet and having varying portions exposed through the openings between the tabs and below at least one of the tabs of the first shingle sheet.

In one embodiment, the width of the buttlap section of each shingle may be at least about 70% of the width of the shingle while the interply material has a width of at least about 100% of the width of the roofing shingle. Alternatively, the width of the buttlap section of each shingle may be at least about 80% of width of the roofing shingle while the interply material has a width of from about 105% to about 130% of the width of the shingle. Each shingle may have an exposure width of at least about 60% of the width of the shingle while the interply material has a width at least about 100% of the width of the shingle. Alternatively, each shingle may have an exposure width of at least about 64% of the width of the shingle while the interply material has a width of from about 105% to about 130% of the width of the shingle.

The roofing system of the present invention may alternatively include three tab asphalt shingles. In such systems, each shingle may have an exposure width of at least about 60% of the width of the shingle while the interply material has a width at least about 100% of the width of the shingle. Alternatively, each shingle may have an exposure width of at least about 64% of the width of the shingle while the interply material has a width of from about 105% to about 130% of the width of the shingle.

In the embodiments of the roofing system summarized above, the interply material is comprised of a water and fire retardant material. The interply material may be comprised of a substrate having an ionic charge coated with a coating having essentially the same ionic charge. The coating consists essentially of a filler material and a binder material. The binder material bonds the filler material together and to the substrate. The coating does not bleed through the substrate. The interply material may be from 10% to 25% by weight glass fibers and the coating may be from 84% to 96% filler selected from the group consisting of fly ash, charged calcium carbonate, ceramic microspheres and mixtures thereof, and from 16% to 4% acrylic latex binder material.

Alternatively, the interply material may be comprised of a substrate having an ionic charge coated on one side with a coating having essentially the same ionic charge. Again, the coating consists essentially of a filler material and a binder material and the binder material bonds the filler material together and to the substrate. The coating does not bleed through the substrate. The substrate is covered on the other side with a water vapor impermeable material selected from the group consisting essentially of metal foils and preformed plastic films. The water vapor impermeable material is attached to the coated substrate with an adhesive. Such materials are described in pending U.S. application Ser. No. 09/897,308 filed on Jul. 2, 2001 which is incorporated by reference herein in its entirety.

Additionally, the interply material may be comprised of a substrate having an ionic charge coated on both sides with a coating having essentially the same ionic charge. The coating again consists essentially of a filler material and a binder material and the binder material bonds the filler material together and to the substrate. The coating does not bleed through the substrate. One side of the coated substrate is covered with a water vapor impermeable material selected from the group consisting essentially of metal foils and preformed plastic films. The water vapor impermeable material is attached to the coated substrate with an adhesive. Alternatively, one side of the coated substrate may be covered with a metal foil water vapor barrier material and the other side of the coated substrate may be covered with a preformed plastic film water vapor impermeable material. Both water vapor impermeable materials may be attached to the coated substrate with an adhesive. Further, both sides of the coated substrate may be coated with the same water vapor impermeable material, either a metal foil or a preformed plastic film, which may be attached to the coated substrate with an adhesive. In such embodiments, the coating may be from 84% to 96% filler selected from the group consisting of fly ash, charged calcium carbonate, ceramic microspheres and mixtures thereof and from 16% to 4% acrylic latex binder material. Alternatively, a water proof coating may be used instead of the impermeable films listed above.

The adhesive for the embodiments described above is selected from the group consisting essentially of low density polyethylene, high density polyethylene, polyethylene-vinyl acetate, polypropylene, polyvinylidene chloride, nylon, polyester and mixtures thereof. Alternatively, an asphaltic adhesive, such as an asphaltic adhesive similar to standard laminating adhesives, may be used.

In the roofing system of the present invention, alternative interply materials may also be employed. One such material is comprised of a roll roofing product including a fiberglass substrate coated with asphaltic material and mineral granules. Another such interply material is comprised of asphalt impregnated felt underlayment material.

In a further embodiment of the present invention, the roofing system comprises a roof deck of a building, a first layer of underlayment material attached to the roof deck, a second layer of the underlayment material attached to the first layer, and a multiplicity of courses of roofing shingles attached to the second layer of underlayment material. The underlayment material may be any of the interply materials described above with the exception of the roll roofing and felt underlayment type products.

The present invention also relates to a laminated roofing shingle comprising a first shingle sheet and a second shingle sheet. The first shingle sheet has a headlap section and a buttlap section. The buttlap section may be at least about 60% of the width of the shingle. The first shingle sheet includes a plurality of tabs which are spaced apart to define one or more openings between the tabs. Each of the tabs has a relatively uniform color throughout the tab.

The second shingle sheet is attached to the underside of the first shingle sheet and has portions exposed through the openings between the tabs. The second shingle sheet has at least first, second, and third horizontal striations thereon across at least partial portions of the second sheet which are exposed through the openings between the tabs.

The striations comprise elongated quadrilateral areas and provide a color gradation on at least partial portions of the second sheet which are exposed through the openings between the tabs. Alternatively, the second shingle sheet may further comprise at least a fourth horizontal striation thereon across at least partial portions of the second sheet which are exposed through the openings between the tabs.

In the aforementioned laminated roofing shingle of the present invention, the width of each of the striations may be approximately equal. In embodiments having three striations on the second sheet, the widths of the first and third striations may be approximately equal and be approximately one-half the width of the second striation. Alternatively, the widths of the first and third striations may be approximately equal and substantially wider than the width of the second striation. Further, the third striation may be substantially wider than the second striation and the first striation may be approximately twice the width of the third striation.

Each of the tabs of the laminated shingles described above may have different color contrasts from one another. Additionally, the dimensions of one of the tabs of the laminated shingles described above may differ from the dimensions of others of the tabs.

An alternative laminated roofing shingle of the present invention also comprises first and second shingle sheets. The first shingle sheet has a headlap section and a buttlap section including a plurality of tabs which are spaced apart to define one or more openings between the tabs. Each of the tabs has a relatively uniform color throughout the tab. The width of the buttlap section may be at least about 60% of the width of the shingle. The second shingle sheet is attached to the underside of the first shingle sheet and has varying portions exposed through the openings between the tabs and below at least one of the tabs of the first shingle sheet.

In one embodiment of each of the laminated shingles described above, the width of the buttlap section of the shingle may be at least 70% of the width of the shingle. In another embodiment, the width of the buttlap section of the shingle may be at least about 80% of width of the roofing shingle. The laminated roofing shingles of the present invention may have an exposure width of at least about 60% of the width of the shingle, preferably an exposure width of at least about 64% of the width of the shingle.

The present invention also includes three tab roofing shingles having an exposure width of at least about 60% of the width of the shingle, preferably an exposure width of at least 64% of the width of the shingle.

BRIEF DESCRIPTION OF THE DRAWINGS

Exemplary embodiments of the present invention will now be described in detail with reference to the accompanying drawings in which:

FIGS. 1 and 1A are perspective views of partial roofing sections covered with embodiments of the roofing system of the present invention;

FIGS. 2 and 2A are perspective views of laminated shingles incorporating embodiments of the present invention;

FIG. 3 is a top plan view of the shingle of FIG. 2;

FIG. 4 is a lower edge view of the shingle of FIG. 2;

FIGS. 5 and 5A are left side views of the shingles of FIGS. 2 and 2A;

FIG. 7 is an exploded isometric view showing shingle components taken from the sheet of roofing material in FIG. 6, which may be used to form the shingle of FIG. 2;

FIG. 8A is an exploded isometric view showing shingle components taken from a sheet of roofing material according to another embodiment of the present invention;

FIG. 8B is an enlarged drawing of a portion of a backer strip of FIG. 8A with transition stripes disposed between adjacent horizontal striations;

FIG. 9 is a perspective view of a partial roofing section covered with another embodiment of the roofing system of the present invention;

FIG. 10 is a top plan view of the shingle shown in FIG. 9;

FIG. 11 is a left side view of the shingle shown in FIG. 9;

DETAILED DESCRIPTION OF THE INVENTION

Figure 6:
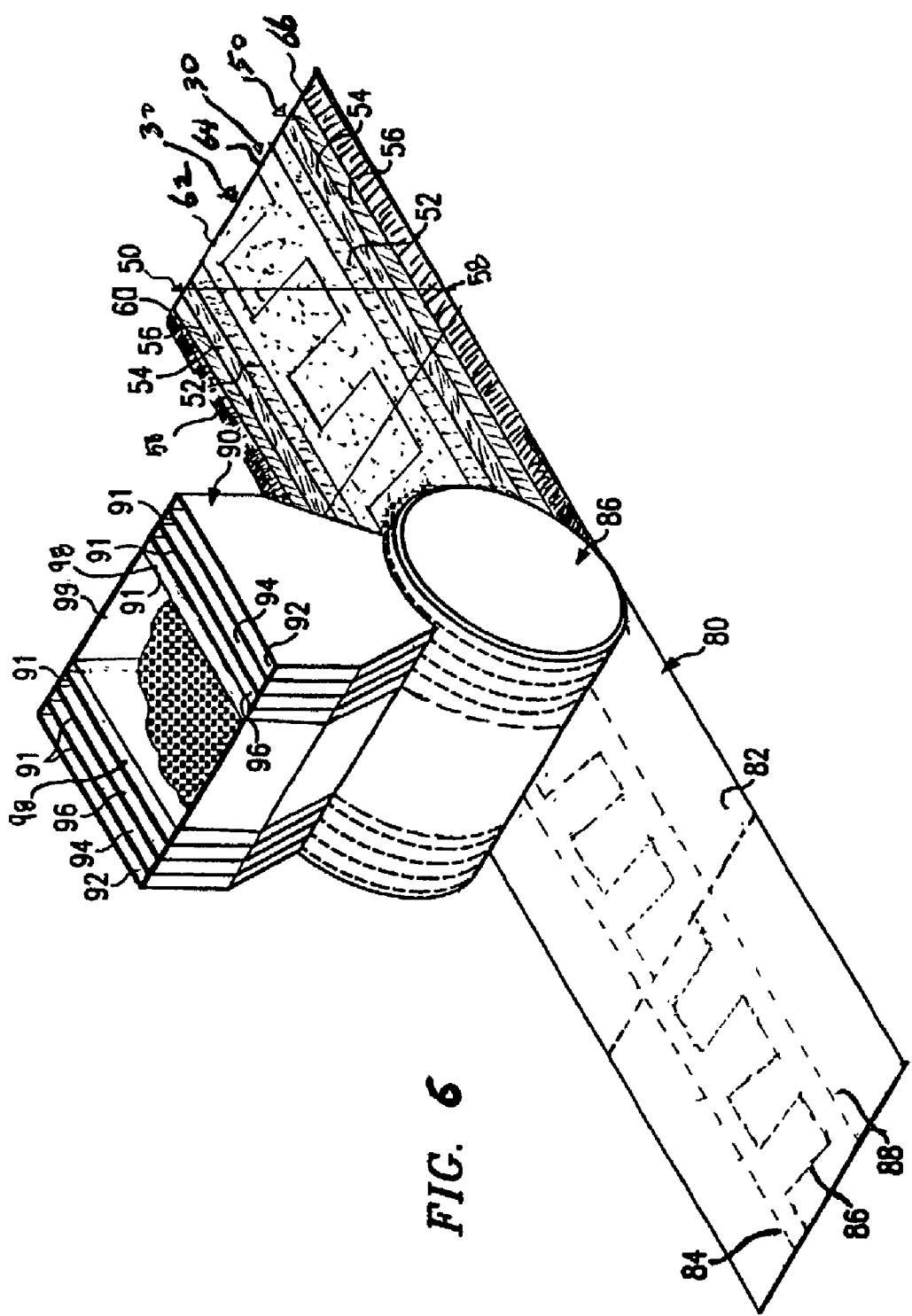
FIG. 6 is an isometric, schematic drawing of a sheet of roofing material incorporating one embodiment of the present invention from which components for the shingle of FIG. 2 may be obtained.

The roofing system and roofing shingles of the present invention provide the aesthetic benefits of large shingles without requiring the retooling of existing machinery. Accordingly, these shingles can be produced by adjusting existing production processes with little or no capital expenditures. The roofing composite material of the present invention also weighs less than a conventional shingle of equivalent exposure size, thus reducing freight costs and roof loads.

The roofing system, examples of which are illustrated in FIGS. 1, 9, 12 and 16, has a multiplicity of courses of roofing shingles and interply material comprising at least one course of interply material overlapping at least about 10% of a first course of shingles, and a second course of shingles overlapping at least a portion of the interply material and the first course of shingles. More than about 40% of the first course of shingles is exposed after installation. The roofing system has a Class A fire resistance rating.

Shingles employed in the roofing system of the present invention may be asphalt or composite shingles. The width of the shingles may be at least about 20% of the length of the shingles.

The asphalt shingles may be laminated shingles. In one embodiment, as illustrated in FIGS. 1–8, each laminated shingle comprises a first shingle sheet having a headlap section and a buttlap section including a plurality of tabs which are spaced apart to define one or more openings between the tabs. Each of the tabs has a relatively uniform color throughout the tab. The width of the buttlap section is at least about 40% of the width of the shingle. A second shingle sheet is attached to the underside of the first shingle sheet and has portions exposed through the openings between the tabs. The second shingle sheet has at least first, second, and third horizontal striations thereon across at least partial portions of the second sheet which are exposed through said openings between the tabs.

The first striation comprises a first elongated quadrilateral area. The first striation has a substantially uniform dark color throughout the first quadrilateral area. The second striation comprises a second elongated quadrilateral area below the first striation. The second striation has a substantially uniform color throughout the second quadrilateral area, the color of the second striation being lighter than the color of the first striation. The third striation comprises a third elongated quadrilateral area below the second striation. The third striation has a substantially uniform color throughout the third quadrilateral area. The color of the third striation is lighter than the color of the second striation. At least the second and third striations provide a color gradation on at least partial portions of the second sheet which are exposed through the openings between the tabs.

The roofing system of the present invention, illustrated in FIGS. 1–8, may further comprise on the second shingle sheet of each laminated roofing shingle at least a fourth horizontal striation thereon across at least partial portions of the second sheet which are exposed through the openings between the tabs. The fourth striation comprises a fourth elongated quadrilateral area below the third striation. The fourth striation has a substantially uniform color throughout the fourth quadrilateral area. The color of the fourth striation is lighter than the color of the third striation. At least the second, third, and fourth striations provide a color gradation on at least partial portions of the second sheet which are exposed through the openings between the tabs.

The width of each of the striations on the second shingle sheet of each shingle may be approximately equal, whether there are three, four or more striations on the second shingle sheet. In embodiments where three striations are employed, the widths of the first and third striations may be approximately equal and approximately one-half the width of the second striation. Alternatively, the widths of the first and third striations may be approximately equal and substantially wider than the width of the second striation. In another embodiment, the third striation may be substantially wider than the second striation and the first striation may be approximately twice the width of the third striation.

In the roofing system of the present invention, the shingles in each course bearing striations of approximately equal width may be placed adjacent to shingles wherein the widths of the first and third striations are approximately equal and are approximately one-half the width of the second striation. Alternatively, the shingles in each course bearing striations of approximately equal width may be placed adjacent to shingles wherein the widths of the first and third striations are approximately equal and are substantially wider than the width of the second striation. In another embodiment, the shingles in each course bearing striations of approximately equal width may be placed adjacent to shingles wherein the third striation is substantially wider than the second striation and the first striation is approximately twice the width of the third striation.

Further, shingles in each course bearing four striations of approximately equal width may be positioned adjacent to shingles bearing three striations wherein the widths of the first and third striations are approximately equal and are approximately one-half the width of the second striation. Moreover, shingles in each course bearing four striations of approximately equal width may be placed adjacent to shingles bearing three striations wherein the widths of the first and third striations are approximately equal and are substantially wider than the width of the second striation. In an additional embodiment, shingles in each course bearing striations of approximately equal width may be placed adjacent to shingles bearing three striations wherein the third striation is substantially wider than the second striation and the first striation is approximately twice the width of the third striation.

In all of the aforementioned laminated shingle embodiments, each of the tabs on the first shingle sheet of each shingle may have a different color contrast from one another. Additionally, the dimensions of one of the tabs on the first shingle sheet of each shingle may differ from the dimensions of others of the tabs. Each shingle may further comprise an interply alignment line positioned horizontally across the headlap section of the shingle. The interply alignment line may be positioned horizontally across a common bonding region of the shingle.

Each laminated shingle as described above may further comprise a transition stripe disposed between a pair of horizontal striations having a color value comprising a mixture of the colors associated with the pair of horizontal striations. The mixture of the colors may include from about 25% to 75% of the color value of each of the pairs of horizontal striations.

The width of the buttlap section of each shingle in the roofing system described above may be at least about 70% of the width of the shingle while the interply material may have a width of at least about 100% of the width of the roofing shingle. Alternatively, the width of the buttlap section of each such shingle may be at least about 80% of width of the roofing shingle while the interply material may have a width of from about 105% to about 130% of the width of the roofing shingle. Each shingle of the roofing system described above may have an exposure width of at least about 60% of the width of the shingle while the interply material has a width of at least about 100% of the width of the shingle. Alternatively, each such shingle may have an exposure width of at least about 64% of the width of the shingle while the interply material has a width of from about 105% to about 130% of the width of the shingle.

The roofing system of the present invention may alternatively include laminated shingles illustrated in FIGS. 9–11 comprising first and second shingle sheets. The first shingle sheet has a headlap section and a buttlap section including a plurality of tabs which are spaced apart to define one or more openings between the tabs. Each of the tabs has a relatively uniform color throughout the tab. The width of the buttlap section is at least about 40% of the width of the shingle. The second shingle sheet is attached to the underside of the first shingle sheet and has varying portions exposed through the openings between the tabs and below at least one of the tabs of the first shingle sheet. The width of the buttlap section of each shingle may be at least about 70% of the width of the shingle while the interply material has a width of at least about 100% of the width of the roofing shingle. Alternatively, the width of the buttlap section of each shingle may be at least about 80% of width of the roofing shingle while the interply material has a width of from about 105% to about 130% of the width of the roofing shingle. Each shingle may have an exposure width of at least about 60% of the width of the shingle while the interply material has a width at least about 100% of the width of the shingle. Alternatively, each shingle may have an exposure width of at least about 64% of the width of the shingle while the interply material has a width of from about 105% to about 130% of the width of the shingle.

The roofing system of the present invention may alternatively include three tab asphalt shingles. In such a system, each shingle may have an exposure width of at least about 60% of the width of the shingle while the interply material has a width at least about 100% of the width of the shingle. Alternatively, each shingle may have an exposure width of at least about 64% of the width of the shingle while the interply material has a width of from about 105% to about 130% of the width of the shingle.

In the embodiments of the roofing system summarized above, the interply material is comprised of a water and fire retardant material. The interply material may be comprised of a substrate having an ionic charge coated with a coating having essentially the same ionic charge. The coating consists essentially of a filler material and a binder material. The binder material bonds the filler material together and to the substrate. The coating does not bleed through the substrate. Such an interply material is described in U.S. Pat. No. 5,965,257, the entirety of which is incorporated herein by reference, and is sold by Elk Corporation of Dallas, Tex. as VersaShield®. The interply material may be from 10% to 25% by weight glass fibers and the coating may be from 84% to 96% filler selected from the group consisting of fly ash, charged calcium carbonate, ceramic microspheres and mixtures thereof, and from 16% to 4% acrylic latex binder material.

Alternatively, the interply material may be comprised of a substrate having an ionic charge coated on one side with a coating having essentially the same ionic charge. The coating again consists essentially of a filler material and a binder material and the binder material bonds the filler material together and to the substrate. The coating does not bleed through the substrate. The substrate is covered on the other side with a water vapor impermeable material selected from the group consisting essentially of metal foils and preformed plastic films. The water vapor impermeable material is attached to the coated substrate with an adhesive. Elk Corporation markets materials including the preformed plastic film as VersaShield® Vapor Seal-II™ and Elk markets materials including the metal foils as VersaShield® ThermoClad-II™.

Additionally, the interply material may be comprised of a substrate having an ionic charge coated on both sides with a coating having essentially the same ionic charge. The coating again consists essentially of a filler material and a binder material and the binder material bonds the filler material together and to the substrate. The coating does not bleed through the substrate. One side of the coated substrate is covered with a water vapor impermeable material selected from the group consisting essentially of metal foils and preformed plastic films. The water vapor impermeable material is attached to the coated substrate with an adhesive. Alternatively, one side of the coated substrate may be covered with a metal foil water vapor barrier material and the other side of the coated substrate may be covered with a preformed plastic film water vapor impermeable material. Both water vapor impermeable materials may be attached to the coated substrate with an adhesive. Further, both sides of the coated substrate may be coated with either a metal foil water vapor impermeable material or a preformed plastic film water vapor impermeable material which may be attached to the coated substrate with an adhesive. The adhesive for the embodiments described above is selected from the group consisting essentially of low density polyethylene, high density polyethylene, polyethylene-vinyl acetate, polypropylene, polyvinylidene chloride, nylon, polyester and mixtures thereof. In such embodiments, the coating may be from 84% to 96% filler selected from the group consisting of fly ash, charged calcium carbonate, ceramic microspheres and mixtures thereof and from 16% to 4% acrylic latex binder material.

In the roofing system of the present invention, alternative interply materials may also be employed. One such material is comprised of a roll roofing product including a fiberglass substrate coated with asphaltic material and mineral granules. Such interply materials include Ridglass TG-2 sold by Ridglass Shingle Manufacturing Co. of Fresno, Calif.; OCF Roll Roofing sold by Owens Corning of Toledo, Ohio and Black Warrior sold by Black Warrior Roofing, Inc. of Tuscaloosa, Ala. Another such interply material is comprised of asphalt impregnated felt underlayment material. That type of interply material is sold as Fontana Vulca-Seal 40 by Fontana Paper of Fontana, Calif. and a monoasphaltic barrier product available from Vliepa of Bracht, Germany. Suitable interply materials include JM Sure Grip and JM Nord Shield, available from Johns Manville, and GAF Weatherwatch, available from GAF.

In a further embodiment of the present invention, the roofing system comprises a roof deck of a building, a first layer of underlayment material attached to the roof deck, a second layer of the underlayment material attached to the first layer, and a multiplicity of courses of roofing shingles attached to the second layer of underlayment material. The underlayment material may be any of the interply materials described above with the exception of the roll roofing and felt underlayment type products.

The present invention also relates to a laminated roofing shingle comprising a first shingle sheet and a second shingle sheet. The first shingle sheet has a headlap section and a buttlap section. The buttlap section is at least about 60% of the width of the shingle. The first shingle sheet includes a plurality of tabs which are spaced apart to define one or more openings between the tabs. Each of the tabs has a relatively uniform color throughout the tab.

The second shingle sheet is attached to the underside of the first shingle sheet and has portions exposed through the openings between the tabs. The second shingle sheet has at least first, second, and third horizontal striations thereon across at least partial portions of the second sheet which are exposed through the openings between the tabs. The first striation comprises a first elongated quadrilateral area. The first striation has a substantially uniform dark color throughout the first quadrilateral area. The second striation comprises a second elongated quadrilateral area below the first striation. The second striation has a substantially uniform color throughout the second quadrilateral area. The color of the second striation is lighter than the color of the first striation. The third striation comprises a third elongated quadrilateral area below the second striation. The third striation has a substantially uniform color throughout the third quadrilateral area. The color of the third striation is lighter than the color of the second striation. At least the second and third striations provide a color gradation on at least partial portions of the second sheet which are exposed through the openings between the tabs.

The laminated roofing shingle of the invention may further comprise on the second shingle sheet at least a fourth horizontal striation thereon across at least partial portions of the second sheet which are exposed through the openings between the tabs. The fourth striation comprises a fourth elongated quadrilateral area below the third striation. The fourth striation has a substantially uniform color throughout the fourth quadrilateral area. The color of the fourth striation is lighter than the color of the third striation. At least the second, third, and fourth striations provide a color gradation on at least partial portions of the second sheet which are exposed through the openings between the tabs.

In the aforementioned laminated roofing shingles of the present invention the width of each of the striations may be approximately equal. In embodiments having three striations on the second sheet, the widths of the first and third striations may be approximately equal and approximately one-half the width of the second striation. Alternatively, the widths of the first and third striations may be approximately equal and substantially wider than the width of the second striation. Further, the third striation may be substantially wider than the second striation and the first striation may be approximately twice the width of the third striation.

Each of the tabs of the laminated shingles described above may have different color contrasts from one another. Additionally, the dimensions of one of the tabs may differ from the dimensions of others of the tabs.

An alternative laminated roofing shingle of the present invention also comprises also first and second shingle sheets. The first shingle sheet has a headlap section and a buttlap section including a plurality of tabs which are spaced apart to define one or more openings between the tabs. Each of the tabs has a relatively uniform color throughout the tab. The width of the buttlap section is at least about 60% of the width of the shingle. The second shingle sheet is attached to the underside of the first shingle sheet and has varying portions exposed through the openings between the tabs and below at least one of the tabs of the first shingle sheet.

In one embodiment of each of the laminated shingles described above, the width of the buttlap section of the shingle is at least 70% of the width of the shingle. In another embodiment, the width of the buttlap section of the shingle is at least about 80% of width of the roofing shingle. The laminated roofing shingles of the present invention may have an exposure width of at least about 60% of the width of the shingle. Alternatively, the laminated shingles may have an exposure width of at least about 64% of the width of the shingle.

The present invention also includes three tab roofing shingles having an exposure width of at least about 60% of the width of the shingle, preferably an exposure width of at least about 64% of the width of the shingle.

According to one exemplary embodiment of the present invention, a laminated shingle 20 is illustrated in FIGS. 2 to 5. The laminated shingle 20 preferably comprises a first shingle sheet 30 attached to a second shingle sheet 50. First shingle sheet 30 has a generally rectangular configuration defining a headlap section 32 of the laminated shingle 20, with a plurality of tabs 36 extending therefrom to define a buttlap section 34 of the laminated shingle 20. Tabs 36 may also be referred to as "dragon teeth." A plurality of openings 38 are formed between adjacent tabs 36. The second shingle sheet 50 also has a generally rectangular configuration and is disposed beneath tabs 36 with portions of the second shingle sheet 50 exposed through the plurality of openings 38.

Various techniques such as gluing may be used to attach the second shingle sheet 50 to the underside of the first shingle sheet 30. The resulting laminated shingle 20 has a generally rectangular configuration defined in part by longitudinal edges 22 and 24 with lateral edges 26 and 28 disposed there between. Longitudinal edge 22 is defined by an end of headlap section 32 and constitutes the upper edge of the laminated shingle 20. Longitudinal edge 24 is defined by an end of buttlap section 34 and constitutes the lower (or leading) edge of laminated shingle 20. A plurality of release tape strips 40 or a continuous line of release tape may be disposed on the exterior of first shingle sheet 30 on the headlap section 32 of the shingle. Preferably, the release tape is placed on the back of headlap section 32. Self sealing adhesive strips or a continuous line of sealant material (not shown) can also preferably be disposed on the interior or unexposed side of second shingle sheet 50 near longitudinal edge 24.

The resulting laminated shingle 20 also preferably has an interply alignment line 41, which will be discussed in greater detail below. Although the interply alignment line 41 can be positioned anywhere in the headlap section 32, it is preferably positioned in common bonding region 33 of laminated shingle 20. The common bonding region 33 is the only region of the laminated shingle where there are two layers of material throughout the length of the laminated shingle.

First shingle sheet 30 may sometimes be referred to as a "tab sheet" or a "dragon tooth sheet," and second shingle sheet 50 may sometimes be referred to as a "backer strip" or "shim." In addition, openings 38 formed between adjacent tabs 36 with portions of backer strip 50 disposed thereunder may sometimes be referred to as "valleys." Depending upon the desired application and appearance of each laminated shingle 20, tabs 36 may have equal or different widths and may have a square, rectangular, trapezoidal, or any other desired geometric configuration. In the same respect, openings 38 may have equal or different widths and may have a square, rectangular, trapezoidal or any other desired geometric configuration. As will be explained later in more detail, laminated shingles 20 may be formed from a sheet 80 of roofing material shown in FIG. 6 with tabs 36 and openings 38 formed as a "reverse image" of each other.

For the preferred embodiment of the present invention, laminated shingle 20 may be formed from an asphalt coated fiberglass mat. If desired, the present invention may also be used with shingles formed from organic felt or other types of base material. Accordingly, the present invention is not limited to use with shingles including a fiberglass mat.

The exposed outer surface or weather surface 42 for shingle 20 is defined in part by tabs 36 and the portions of backer strip 50 which are exposed through openings 38 between adjacent tabs 36. Weather surface 42 of laminated shingle 20 may be coated with various types of mineral granules to protect the asphalt coating, to add color to laminated shingle 20 and to provide fire resistance. For some applications, ceramic coated mineral granules may be used to form the outer layer comprising weather surface 42. Also, a wide range of mineral colors from white and black to various shades of red, green, brown and any combination thereof may be used to provide the desired color for shingle 20. The underside of shingle 20 may be coated with various inert minerals with sufficient consistency to seal the asphalt coating.

According to the present invention, three or more horizontal striations are provided on the surface of backer strip 50 which is exposed through openings 38. The horizontal striation nearest the headlap section of the shingle is made a uniformly dark color. Other horizontal striations are each made of a uniform color which together provide a color gradient or gradation according to the teachings of U.S. Pat. Nos. 5,369,929; 5,611,186; and 5,666,776, which are incorporated herein by reference in their entireties. The color of the striation nearest the headlap section may be black or may be selected to be consistent with (i.e., to continue) the color gradation of the other horizontal striations.

The laminated shingles of the present invention have a buttlap section 34, which is at least about 60%, preferably at least about 70%, and more preferably at least about 80% of the width of the laminated shingle, i.e., the combined width of the buttlap section 34 and the headlap section 32. The term "about," as used herein, means ±10% of the stated value. For example, an exemplary shingle having the dimensions of 13.25 inches in width and 36 inches in length would have a buttlap section of at least about 8 inches in width (preferably at least about 9.3 inches and more preferably at least about 10.6 inches). Accordingly, the laminated shingles of the present invention have an exposure width of at least about 60%, preferably at least about 64% of the width of the laminated shingle, i.e., the combined width of the buttlap section 34 and the headlap section 32. The exposure width is the portion of the buttlap section 34 that is exposed to the environment when the shingle is laid up on a roof. For example, an exemplary shingle having the dimensions of 13.25 inches in width and 36 inches in length would have an exposure width of at least about 8 inches, preferably at least about 8.5 inches.

Using the foregoing unique combination of buttlap section (exposure) dimension and arrangement of color striations, the laminated shingle according to the present invention provides a significantly greater visual appearance than existing laminated shingles. While the improvement in visual appearance is applicable to all types of roofs, it is especially significant on low-sloped roofs (i.e., those roofs having less than six feet of rise for every twelve feet of run).

In preferred embodiments, the laminated shingle illustrated in FIGS. 1 through 4 has a width of 12 inches and a length of 35.5 inches. The exposure is 8.5 inches. The backer strip is 9.75 inches wide. The interply alignment line is located 10.5 inches from the bottom of the shingle and the nail zone is 8.75 inches to 9.25 inches from the bottom of the shingle. Both the release tape and the self seal sealant are on the back of the shingle. The interply material is 18 inches wide. In the roofing system, the interply is at least double ply with one inch of triple ply overlap.

Another exemplary embodiment of the present invention is shown in FIGS. 9, 10 and 11 which illustrate the inventive roofing system and laminated shingle 120. FIG. 9 illustrates courses of shingles 120 and interply material 260. The laminated shingle 120 preferably comprises a first shingle sheet 130 attached to a second shingle sheet 150. First shingle sheet 130 has a generally rectangular configuration defining a headlap section 132 with a plurality of tabs 136 extending therefrom to define a buttlap section 134 of the laminated shingle 120. A plurality of openings 138 are formed between adjacent tabs 136. The second shingle sheet 150 also has a generally rectangular configuration and is disposed beneath tabs 136 with portions of the second shingle sheet 150 exposed through the plurality of openings 138 and below at least one of the tabs 136.

As in the aforementioned laminated shingle embodiment, various techniques such as gluing may be used to attach the second shingle sheet 150 to the underside of the first shingle sheet 130. The resulting laminated shingle 120 has a generally rectangular configuration defined by longitudinal and lateral edges as noted above with respect to the other embodiment of a laminated shingle. A plurality of release tape strips 140 or a continuous line of release tape may be disposed on the back of the second shingle sheet 150. Self sealing adhesive strips 142 or a continuous line of sealant material may be disposed as illustrated.

The resulting laminated shingle 120 also preferably has an interply alignment line 141 which will be discussed in greater detail below. Although the interply alignment line 141 can be positioned anywhere in the headlap section 132, it is preferably positioned in the common bond region 133 of the laminated shingle 120.

The phraseology noted above regarding "tab sheet", "backer strip", etc. is also applicable to the laminated shingle embodiment in FIGS. 9–11. Also, the exposed outer surface or weather surface 142 for shingle 120 is defined in part by tabs 136 and the portions of backer strip 150 which are exposed through openings 138 and below tabs 136. The weather surface 142 of laminated shingle 120 may be coated with various types of mineral granules as noted above.

Figure 12:
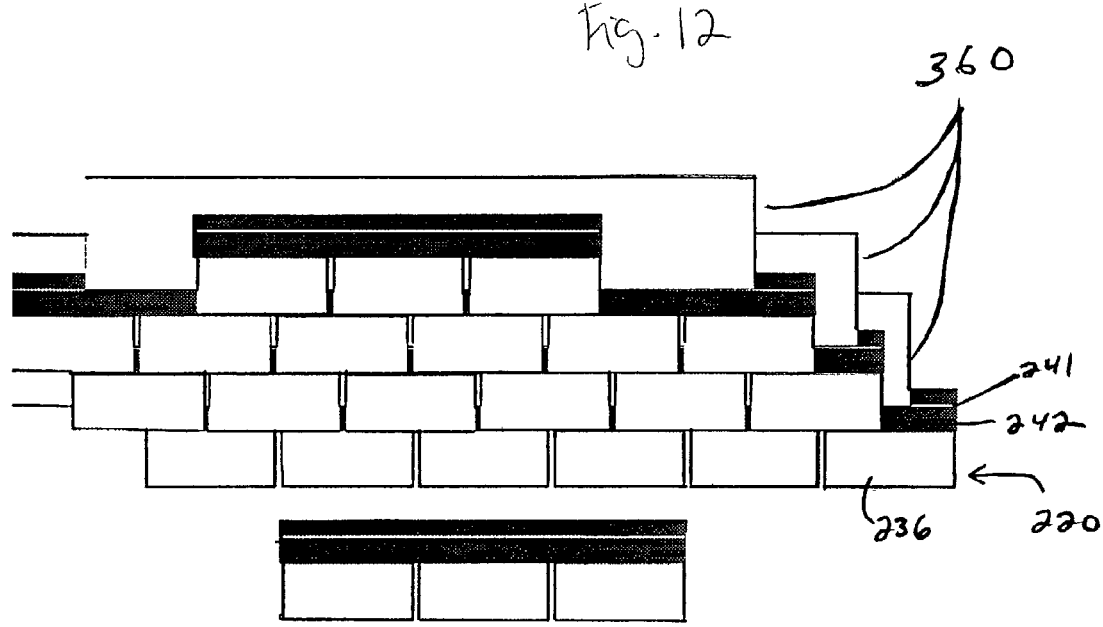
FIG. 12 is a perspective view of a partial roofing section covered with an alternative embodiment of the roofing system of the present invention.
Figure 13:
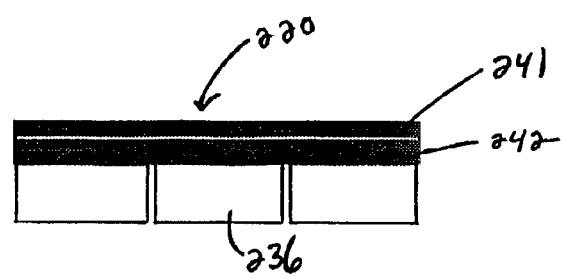
FIG. 13 is a top plan view of the shingle featured in the roofing system of FIG. 12.

FIGS. 12 and 13 illustrate the roofing system of the present invention employing three tab shingles. In FIG. 12, a multiplicity of courses of roofing shingle 220 and interply material 360 are shown on a portion of a roof. An interply alignment line 241 and self-sealing adhesive strips 242 are also illustrated. Three tab shingles are single ply roofing materials usually comprising a strip of asphalt roofing material which has been cut to show three separate tabs 236.

For the laminated shingle depicted in FIGS. 9–11, the preferred dimensions of the shingle are 12–5.8 inches width by 38 inches length. The exposure is 7 inches and the backer strip is 8 inches wide. The interply alignment line is 9 inches from the bottom of the shingle and the nail zone is 7.25 inches to 7.75 inches from the bottom of the shingle. The interply is 16 inches wide. The tab lengths are 5¾ inches to 7 inches long. There are 54 shingles per square and 18 shingles per bundle.

For the shingles depicted in FIGS. 12 and 13, the preferred dimensions are 9 inch width by 36 inch length. The exposure is 5 inches. The interply alignment line is located 7 inches from the bottom of the shingle. Release tape is on the back of the shingle and the self-seal sealant is on the front. The interply material is 10.5 inches wide.

Table I below provides a shingle product comparison between typical prior art shingle dimensions and the roofing shingles and roofing system of the present invention:

and 15, the area of each shingle is 3.52 ft.$^2$ and 48 shingles cover 100 sq. ft. of deck surface. Other characteristics of the roofing system illustrated in those figures are as follows:

Dimensions and Tolerances:
Length—not exceeding +/−½"
Width—not exceeding +/−¼"
Interply Requirements:
Materials:
VersaShield Underlayment available from Elk Corporation of Dallas.
D4601 Type I Base Sheet, an asphalt coated glass fiber based sheet used in roofing. For the present invention Type I materials are preferred over the heavier, more expensive Type II materials. Acceptable materials are available as ZBASE from Black Warrier Roofing, Inc. of Tuscaloosa, Ala.
D2626 Base Sheet, an asphalt saturated and coated organic felt based sheet used in roofing and available as Vulca-Seal from Fontana Paper of Fontana, Calif.
ICBO AC-165 Underlayment, an asphalt coated glass fiber mat roof underlayment available as TG-2 SBS all purpose underlayment/base sheet from Ridglass Shingle Manufacturing Co. of Fresno, Calif.
D1970 Fully Adhered membrane, an ice and water self adhering polymer modified bituminous sheet material used as steep roofing underlayment for ice dam protection available from CertainTeed, GAF, W. R. Grace, Carlisle, Tamko and others.
Vliepatex Coating B Interply Material available from Vliepa of Bracht, Germany.
Dimensions:
Minimum 15" wide
Application:
To be placed 2" above the shingle exposure horizontally across the roof.
End laps a minimum of 6".

Returning to FIGS. 1 through 4, the exemplary embodiment shown includes a backer strip 50 with four horizontal striations 52, 54, 56, and 58. Striation 58, the striation adjacent the headlap section of the shingle, is a uniformly dark-colored striation. The horizontal striations 52, 54, and 56 are colored striations that provide a color gradient or gradation from a light color near the leading edge 24 to a dark color near the upper portion of each opening 38. The color of the horizontal striation 58 may be selected to be consistent with (i.e., to continue) the color gradient or gradation of the other striations (so that striations 52 through 58 altogether provide a color gradient or gradation). Pref-

TABLE I

| Shingle Type | Exposure | Length | Width | Sq. wt. | Reduced Width | Reduced Sq. wt. | Wt./material savings |
|---|---|---|---|---|---|---|---|
| 3 Tab asphalt | 5 | 36 | 12 | 210 | 9 | 160 | 24% |
| Large asphalt | 8.25 | 36 | 19 | 350 | 12 | 250 | 29% |
| State | 6 | 12 | 14 | 1200 | 10 | 850 | 29% |
| Wood | 10 | Varies | 24 | 200 | 16 | 150 | 25% |

Figure 14:
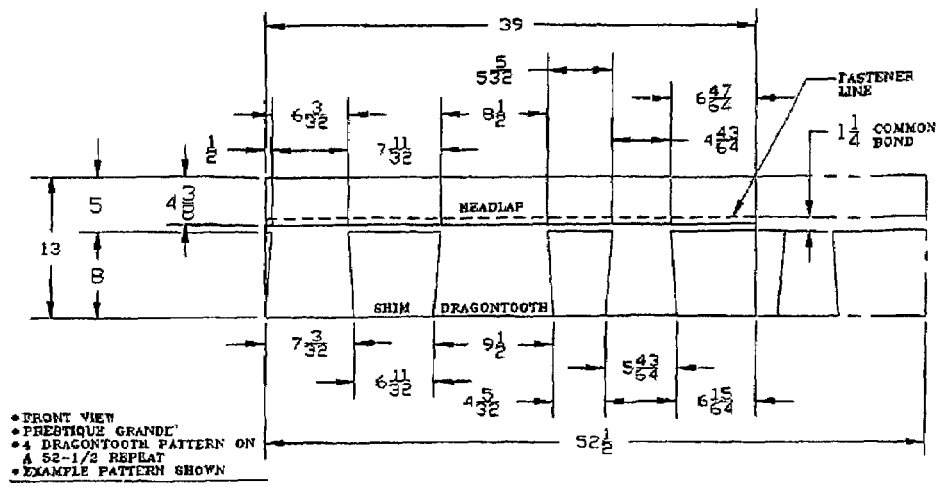
FIG. 14 is a front view of a laminated shingle of the present invention.
Figure 15:
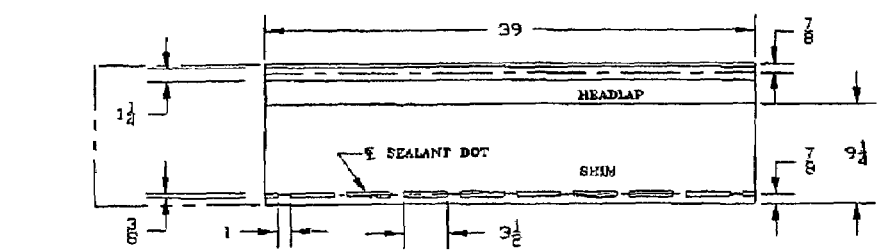
FIG. 15 is a back view of the shingle of FIG. 14.
Figure 16:
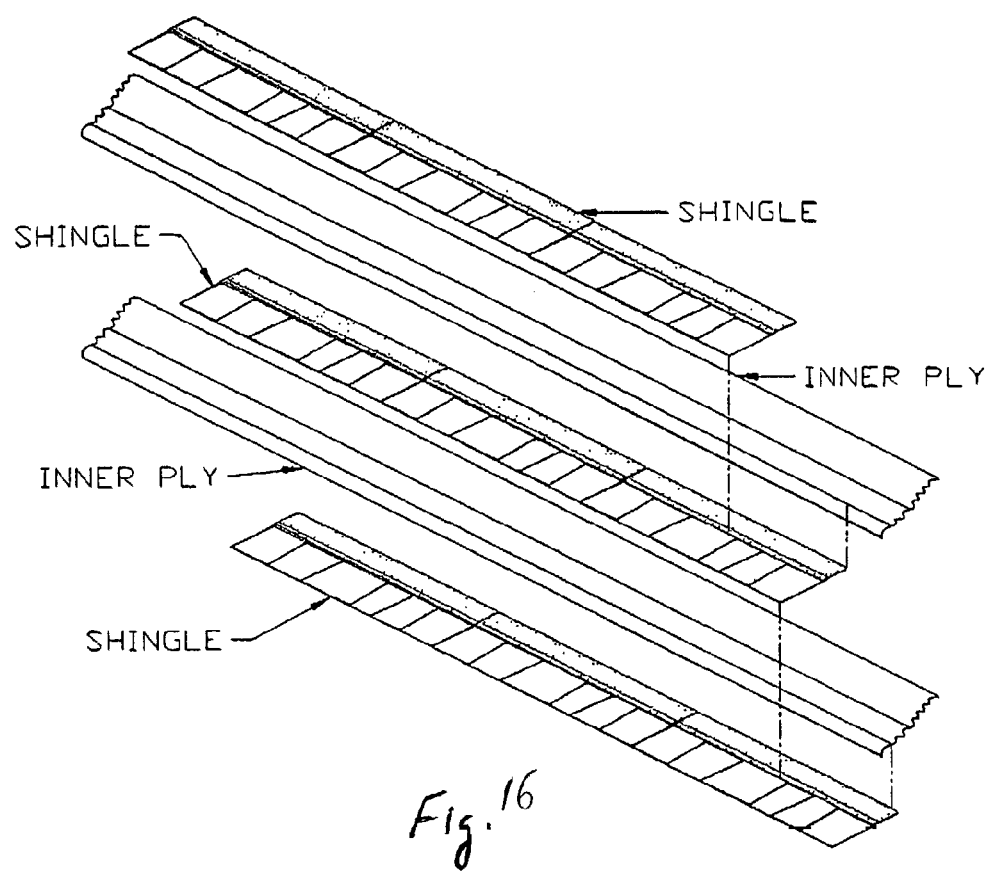
FIG. 16 is a layout view of an embodiment of the roofing system of the present invention.

While many different shingle dimensions may be utilized with the present invention, exemplary dimensions are provided in FIG. 14. In that embodiment, the laminated shingles are not less than 100 lb./100 ft.$^2$ As illustrated in FIGS. 14 and 15, the width of each striation is approximately equal. In addition, for aesthetic reasons, it is preferred that the width of each striation be in the range of about one to about two inches.

The number of horizontal striations and the width of each striation on backer strip 50 may be varied depending upon the desired aesthetic appearance of the resulting laminated shingle 20. It is preferred, however, for a shingle to have an exposure width of 7 to 9 inches and from three to six horizontal striations thereon.

Each striation may have a different color to establish the desired amount of contrast. For the purposes of this patent application, a different color may include a different tone. In addition, contrast for purposes of this patent application is defined as the degree of difference in the tone or shading between areas of lightest and darkest color. For some applications, a gradual change in contrast associated with a large number of striations may provide the appearance of depth or thickness associated with wood or other natural products. Also, the amount or degree of contrast in the color gradient exposed in each opening 38 may be varied depending upon the desired aesthetic appearance. An important feature of the present invention is the ability to vary the color gradient and the amount of contrast to provide the desired illusion or appearance of thickness on the finished roof.

FIGS. 6–8A show one procedure for fabricating a laminated shingle 20 from a sheet 80 of roofing material. Various procedures and methods may be used to manufacture sheet 80 from which shingles incorporating the present invention may be fabricated. Examples of such procedures are contained in U.S. Pat. No. 1,722,702 entitled "Roofing Shingle"; U.S. Pat. No. 3,624,975 entitled "Strip Shingle of Improved Aesthetic Character"; U.S. Pat. No. 4,399,186 entitled "Foam Asphalt Weathering Sheet for Rural Roofing Siding or Shingles"; and U.S. Pat. No. 4,405,680 entitled "Roofing Shingle." Each of these patents is incorporated by reference herein in its entirety.

Sheet 80 is preferably formed from a fiberglass mat placed on a jumbo roll (not shown) having a width corresponding to the desired sheet 80. Laminated shingles 20 are typically fabricated in a continuous process starting with the jumbo roll of fiberglass mat. As previously noted, laminated shingle 20 may also be fabricated using organic felt or other types of base material.

Sheet 80 shown in FIG. 6 preferably comprises a fiberglass mat with an asphalt coating which both coats the fibers and fills the void spaces between the fibers. A powdered mineral stabilizer (not shown) may be included as part of the asphalt coating process. A smooth surface of various inert minerals of sufficient consistency may be placed on the bottom surface of sheet 80 to seal the asphalt coating.

Top surface 82 is preferably coated with a layer of mineral granules such as ceramic coated stone granules to provide the desired uniform color portions and the color gradient portions associated with weather surface 42 of shingle 20. Typically, the mineral granules are applied to the sheet 80 while the asphalt coating is still hot and forms a tacky adhesive.

FIG. 6 shows a schematic representation of a roller 86 and mineral granule hopper 90 which may be used to provide the desired granular surface coating to sheet 80. The hopper 80, which may be any hopper which is well known in the art, includes a plurality of partitions 91 which divide the hopper 90 into three sets of compartments: a set of compartments 92, 94, 96 and 98 at each end of the hopper and a central compartment 99 between the ends. The central compartment 99 of hopper 90 contains a uniform mixture of the mineral granules which will produce the desired color on dragon teeth or tabs 36 and the other portions of first shingle sheet 30, which will be exposed to the environment. This transfer of mineral granules is sometimes referred to as a "color drop." The rotation of roller 86 and the movement of sheet 80 are coordinated to place the desired color drop on each shingle 20.

For the embodiment of the present invention shown in FIGS. 6–8A, each first shingle sheet 30 will have the same uniform mixture of mineral granules on both the headlap section and the buttlap section. For the embodiment shown in FIGS. 1 to 4, headlap section 32 may have the same layer of mineral granules as buttlap section 34 or headlap section 32 may have a neutral or non-colored layer of mineral granules. The surface layer on headlap section 32 may be varied as desired for each application.

Different colored mineral granules corresponding to the desired color of horizontal striations 52, 54, 56, and 58 are preferably placed in the appropriate compartments 92, 94, 96, and 98, respectively. As sheet 80 passes under roller 86, mineral granules from the appropriate compartment in hopper 90 will fall onto roller 86 and will be transferred from roller 86 to top surface 82 of sheet 80. The volume or pounds per square foot of mineral granules placed on surface 82 is preferably the same throughout the full width of sheet 80. However, by dividing the hopper 90 into compartments, the color of various portions of sheet 80 may be varied including providing horizontal striations 52, 54, 56, and 58 for backer strip 50.

It is important to note that conventional procedures for fabricating shingles having an exterior surface formed by mineral granules include the use of granule blenders and color mixers, along with other sophisticated equipment to ensure a constant uniform color at each location on the exposed portions of the shingles. Extensive procedures are used to ensure that each color drop on a sheet of roofing material is uniform. The color drop between shingles may be varied to provide different shades or tones in color. However, within each color drop, concerted efforts have traditionally been made to insure uniformity of the color on the resulting shingle associated with each color drop.

Once the color drop process is complete, the sheet 80 is allowed to cool. After the sheet 80 is cooled, it is then cut. As shown by dotted lines 84, 86, and 88 in FIG. 6, sheet 80 may be cut into four horizontal lengths or lanes 60, 62, 64, and 66. The width of lanes 62 and 64 corresponds with the desired width for first shingle sheet 30. The width of lanes 60 and 66 corresponds with the desired width for second shingle sheet 50.

The cut along dotted line 86 corresponds with the desired pattern for dragon teeth 36 and associated openings 38. For some applications, more than four lanes may be cut from a sheet of roofing material similar to sheet 80. The number of lanes is dependent upon the width of the respective sheet of roofing material and the desired width of the resulting shingles.

Sheet 80 may also be cut laterally to correspond with the desired length for the resulting first shingle sheet 30 and second shingle sheet 50. As shown in FIGS. 5, 7, and 8A, each lateral cut of sheet 80 results in two backer strips 50 and two first shingle sheets 30 which may be assembled with each other to form two laminated shingles 20. The resulting laminated shingles 20 may be packaged in a square for future installation on a roof as is well known in the art.

The cutting of sheet 80 and the assembly of laminated shingles 20 may be performed in a number of ways. For example, the laminated shingles 20 may be produced through an off-line lamination process in which the sheet 80 is cut both longitudinally and laterally and then the tab sheets and backer sheets, which are produced, are matched and attached together. Alternatively, and more preferably, the laminated shingles 20 may be produced in a continuous in-line lamination process in which the sheet 80 is cut longitudinally by a rotary die cutter, producing horizontal lengths (such as lanes 60, 62, 64, and 66), which consist of continuous tab sheet strips and backer sheet strips. The tab sheet strips and backer sheet strips are joined and adhered together to produce laminated shingle strips through means well known in the art. The laminated shingle strips may then be passed through a cutting cylinder, which cuts the strips into individual shingles. After discrete shingles are formed, they can be processed with commonly used apparatus for handling shingles, such as a shingle stacker to form stacks of shingles and a bundle packer to form shingle bundles.

It is important to note that a color gradient of the present invention may be placed on shingles using various procedures and various types of materials. The present invention is not limited to shingles formed by the process shown in FIGS. 6–8A.

FIG. 8A is an exploded isometric view showing shingle components taken from a sheet of roofing material according to another embodiment of the present invention. In the embodiment of FIG. 8A, as better shown in FIG. 8B, which is an enlarged drawing of a portion of a backer strip of FIG. 8A, transition stripes 152 and 154 are disposed between adjacent pairs 52/54 and 54/56 of the horizontal striations 52, 54 and 56. Each transition stripe has a color value that is a mixture of the colors associated with the two horizontal striations adjacent to the transition stripe. The transition stripes may be used when the difference in contrast between adjacent horizontal striations is sufficiently great that a shingle would present a confused or disjointed appearance without the transition stripes. The transition stripes may be applied as described in U.S. Pat. No. 5,611,186, which is incorporated by reference herein in its entirety.

The present invention also provides a roofing system including (i) a first laminated shingle, as described above, which is located in a first row of shingles, (ii) an interply layer disposed on top of the headlap portion of the first laminated shingle, and (ii) a second laminated shingle, as described above, disposed on top of the interply layer, wherein the second laminated shingle is located in a second row of shingles horizontally adjacent, i.e., above, to the first row of shingles. Accordingly, an interply layer is placed in between each pair of shingles located in horizontally adjacent rows. A limited lateral offset can preferably be provided between horizontally adjacent rows such that any given pair of shingles located in horizontally adjacent rows is positioned to provide a limited lateral offset to each other. The interply layer is preferably placed on top of the first laminated shingle so that the bottom edge of the interply layer is lined up with the interply alignment line of the first laminated shingle, as described above. This roofing system can be repeated to cover the entire roof, e.g., a second interply layer is placed on top of the second laminated shingle, which is located in the second row of shingles, and a third laminated shingle is placed on top of the second interply layer, wherein the third laminated shingle is located in a third row of shingles located horizontally adjacent to the second row of shingles and so on up toward the peak of the roof.

The interply layer can be of any width and length suitable to the application. Preferably, the width of the interply layer is at least about 100%, more preferably from about 105% to about 130%, most preferably from about 105% to about 121% of the width of the laminated shingle. For example, when an exemplary laminated shingle having a width of 13.25 inches is utilized in the roofing system, the interply layer can have a width preferably of about 13.25 inches, more preferably from about 14 inches to about 17.2 inches, and most preferably from about 14 inches to about 16 inches. A plurality of self sealing adhesive strips or a continuous line of self sealing adhesive can preferably be disposed on one or more sides and near one or more edges of the interply layer to secure the interply layer between shingles in horizontally adjacent rows and the roof.

Without wanting to be limited by any one theory, it is believed that the interply layer can effectively replace a large headlap section of a shingle, which was typically believed to be needed for effective protection from the elements. Accordingly, the interply layer can be made of any weather proofing material known in the art. Preferably, the interply layer is made of material that is both fire and water resistant.

An exemplary roofing system according to the present invention is illustrated in FIG. 1. As shown in FIG. 1, a plurality of laminated shingles 20 may be installed on a roof or other structure (not shown) to provide protection from the environment and to provide an aesthetically pleasing appearance. The normal installation procedure for laminated shingles 20 includes placing each shingle 20 on a roof in an overlapping configuration with an interply layer 160 disposed in between horizontally adjacent rows of shingles. Typically, an interply layer 160 is disposed on the headlap section 32 of one shingle 20, and preferably the interply layer 160 will be disposed such that the bottom edge 162 of the interply layer is aligned with an interply alignment line 41. The top edge 166 of the interply layer is preferably disposed on the surface of the roof, e.g. by nailing. A plurality of self sealing adhesive strips or a continuous line of self sealing adhesive can preferably be disposed on the bottom of interply layer 160 near edge 162 of the interply layer to secure the interply layer between shingles in horizontally adjacent rows and on to the roof. Next the buttlap section 34 of one shingle 20 is disposed on top of the interply layer so that the buttlap section is also disposed on top of the headlap section of another shingle 20 in the horizontally adjacent row below. Self-sealing adhesive (not shown) can be used to secure the overlapping shingles 20 on to the interply layer 60. Also, a limited lateral offset is preferably provided between horizontally adjacent rows of shingles 20 to provide an overall aesthetically pleasing appearance for the resulting roof.

Although the present invention has been described with reference to certain preferred embodiments, various modifications, alterations, and substitutions will be apparent to those skilled in the art without departing from the spirit and scope of the invention, as defined by the appended claims.

We claim:

1. A roofing system having a multiplicity of courses of asphalt roofing shingles and interply material comprising at least one course of interply material overlapping at least about 10% of a first course of shingles and a second course of shingles overlapping at least a portion of said interply material and said first course of shingles, such that at least about 60% of said first course of shingles is exposed and said interply extends above said second course of shingles after installation, and wherein said roofing system has a Class A fire resistance rating.

2. The roofing system of claim 1 wherein the width of said shingles is at least about 20% of the length of said shingles.

3. The roofing system of claim 1 wherein said shingles are laminated.

4. The roofing system of claim 3 wherein each laminated shingle comprises a first shingle sheet having a headlap section and an exposed buttlap section including a plurality of tabs which are spaced apart to define one or more openings between said tabs, each of said tabs having a relatively uniform color throughout the tab; wherein the width of the buttlap section is at least about 60% of the width of the shingle;

a second shingle sheet attached to the underside of said first shingle sheet and having portions exposed through said openings between said tabs; said second shingle sheet having at least first, second, and third horizontal striations thereon across at least partial portions of said second sheet which are exposed through said openings between said tabs;

said first striation comprising a first elongated quadrilateral area, said first striation having a substantially uniform dark color throughout said first quadrilateral area;

said second striation comprising a second elongated quadrilateral area below said first striation, said second striation having a substantially uniform color throughout said second quadrilateral area, said color of said second striation being lighter than said color of said first striation; and said third striation comprising a third elongated quadrilateral area below said second striation, said third striation having a substantially uniform color throughout said third quadrilateral area, said color of said third striation being lighter than said color of said second striation; whereby at least said second and third striations provide a color gradation on at least partial portions of said second sheet which are exposed through said openings between said tabs.

5. The roofing system of claim 4 wherein the second shingle sheet of each laminated roofing shingle further comprises at least a fourth horizontal striation thereon across at least partial portions of said second sheet which are exposed through said openings between said tabs, the fourth striation comprising a fourth elongated quadrilateral area below said third striation, said fourth striation having a substantially uniform color throughout said fourth quadrilateral area, said color of said fourth striation being lighter than said color of said third striation; whereby at least said second, third, and fourth striations provide a color gradation on at least partial portions of said second sheet which are exposed through said openings between said tabs.

6. The roofing system of claims 4 or 5 wherein the width of each of said striations on the second shingle sheet of each shingle is approximately equal.

7. The roofing system of claim 4 wherein the widths of the first and third striations are approximately equal and are approximately one-half the width of the second striation.

8. The roofing system of claim 4 wherein the widths of the first and third striations are approximately equal and are substantially wider than the width of the second striation.

9. The roofing system of claim 4 wherein said third striation is substantially wider than said second striation and said first striation is approximately twice the width of said third striation.

10. The roofing system of claim 4 wherein shingles in each course bearing striations of approximately equal width are adjacent to shingles wherein the widths of the first and third striations are approximately equal and are approximately one-half the width of the second striation.

11. The roofing system of claim 4 wherein shingles in each course bearing striations of approximately equal width are adjacent to shingles wherein the widths of the first and third striations are approximately equal and are substantially wider than the width of the second striation.

12. The roofing system of claim 4 wherein shingles in each course bearing striations of approximately equal width are adjacent to shingles wherein said third striation is substantially wider than said second striation and said first striation is approximately twice the width of said third striation.

13. The roofing system of claim 5 wherein shingles in each course bearing four striations of approximately equal width are adjacent to shingles bearing three striations wherein the widths of the first and third striations are approximately equal and are wider than the width of the second striation.

14. The roofing system of claim 5 wherein shingles in each course bearing four striations of approximately equal width are adjacent to shingles bearing three striations wherein the widths of the first and third striations are approximately equal and are approximately one-half the width of the second striation.

15. The roofing system of claim 5 wherein shingles in each course bearing four striations of approximately equal width are adjacent to shingles bearing three striations wherein said third striation is substantially wider than said second striation and said first striation is approximately twice the width of said third striation.

16. The roofing system of claim 4 wherein each of said tabs on the first shingle sheet of each shingle has a different color contrast from one another.

17. The roofing system of claim 4 wherein the dimensions of one of said tabs on the first shingle sheet of each shingle differ from the dimensions of others of said tabs.

18. The roofing system of claim 4 wherein each shingle further comprises an interply alignment line positioned horizontally across the headlap section of the shingle.

19. The roofing system of claim 4 wherein the interply alignment line is positioned horizontally across a common bonding region of the shingle.

20. The roofing system of claim 4 wherein each laminated shingle further comprises a transition stripe disposed between a pair of horizontal striations having a color value comprising a mixture of the colors associated with said pair of horizontal striations.

21. The roofing system of claim 20 wherein said mixture of the colors includes from about 25% to 75% of the color value of each of said pair of horizontal striations.

22. The roofing system of claims 4, 5, 10, 11, 12, 13, 14, or 15 wherein the width of the exposed buttlap section of each shingle is at least about 70% of the width of the shingle; and wherein the interply material has a width of at least about 100% of the width of the roofing shingle.

23. The roofing system of claims 4, 5, 10, 11, 12, 13, 14, or 15 wherein the width of the exposed buttlap section of each shingle is at least about 80% of width of the roofing shingle; and wherein the interply material has a width of from about 105% to about 130% of the width of the laminated roofing shingle.

24. The roofing system of claims 4, 5, 10, 11, 12, 13, 14, or 15 wherein the interply material has a width at least about 100% of the width of the shingle.

25. The roofing system of claims 4, 5, 10, 11, 12, 13, 14, or 15 wherein each shingle has an exposure width of at least about 64% of the width of the shingle and wherein the interply material has a width of from about 105% to about 130% of the width of the shingle.

26. The roofing system of claim 3 wherein each laminated shingle comprises a first shingle sheet having a headlap section and an exposed buttlap section including a plurality of tabs which are spaced apart to define one or more openings between said tabs, each of said tabs having a relatively uniform color throughout the tab; wherein the width of the buttlap section is at least about 60% of the width of the shingle; and a second shingle sheet attached to the underside of said first shingle sheet and having varying portions exposed through said openings between said tabs and below at least one of said tabs of said first shingle sheet.

27. The roofing system of claim 26 wherein the width of the exposed buttlap section of each shingle is at least about 70% of the width of the shingle; and wherein the interply material has a width of at least about 100% of the width of the roofing shingle.

28. The roofing system of claim 26 wherein the width of the exposed buttlap section of each shingle is at least about 80% of the width of the roofing shingle; and wherein the interply material has a width of from about 105% to about 130% of the width of the laminated roofing shingle.

29. The roofing system of claim 26 wherein the interply material has a width at least about 100% of the width of the shingle.

30. The roofing shingle of claim 26 wherein each shingle has an exposure width of at least about 64% of the width of the shingle and wherein the interply material has a width of from about 105% to about 130% of the width of the shingle.

31. The roofing system of claim 1 wherein said shingles are three tab shingles.

32. The roofing system of claim 31 wherein the interply material has a width at least about 100% of the width of the shingle.

33. The roofing system of claim 31 wherein each shingle has an exposure width of at least about 64% of the width of the shingle and wherein the interply material has a width of from about 105% to about 130% of the width of the shingle.

34. The roofing system of claims 4, 5, 10, 11, 12, 13, 14, 15, 26, or 31, wherein the interply material is comprised of a water and fire retardant material.

35. The roofing system of claim 34 wherein said interply material is comprised of a substrate having an ionic charge coated with a coating having essentially the same ionic charge wherein said coating consists essentially of a filler material and a binder material and wherein said binder material bonds the filler material together and to the substrate and wherein said coating does not bleed through said substrate.

36. The roofing system of claim 35 wherein said interply material is from 10% to 25% by weight glass fibers and said coating is from 84% to 96% filler selected from the group consisting of fly ash, charged calcium carbonate, ceramic microspheres and mixtures thereof, and from 16% to 4% acrylic latex binder material.

37. The roofing system of claim 34 wherein said interply material is comprised of a substrate having an ionic charge,
(a) coated on one side with a coating having essentially the same ionic charge wherein said coating consists essentially of a filler material and a binder material and wherein said binder material bonds the filler material together and to the substrate and wherein said coating does not bleed through said substrate; and
(b) covered on the other side with a water vapor impermeable material selected from the group consisting essentially of metal foils and preformed plastic films; wherein said water vapor impermeable material is attached to said coated substrate with an adhesive.

38. The roofing system of claim 34 wherein said interply material is comprised of a substrate having an ionic charge coated on both sides with a coating having essentially the same ionic charge wherein said coating consists essentially of a filler material and a binder material and wherein said binder material bonds the filler material together and to the substrate and wherein said coating does not bleed through said substrate;

wherein one side of said coated substrate is covered with a water vapor impermeable material selected from the group consisting essentially of metal foils and preformed plastic films; and wherein said water vapor impermeable material is attached to said coated substrate with an adhesive.

39. The roofing system according to claim 38 wherein one side of said coated substrate is covered with a metal foil water vapor barrier material and the other side of said coated substrate is covered with a preformed plastic film water vapor impermeable material; and wherein both water vapor impermeable materials are attached to said coated substrate with an adhesive.

40. The roofing system according to claim 38 wherein both sides of the coated substrate are coated with a metal foil water vapor impermeable material and wherein said water vapor impermeable material is attached to said coated substrate with an adhesive.

41. The roofing system according to claim 38 wherein both sides of the coated substrate are coated with a preformed plastic film water vapor impermeable material and wherein said water vapor impermeable material is attached to said coated substrate with an adhesive.

42. The roofing system according to claim 38 wherein said adhesive is selected from the group consisting essentially of low density polyethylene, high density polyethylene, polyethylene-vinyl acetate, polypropylene, polyvinylidene chloride, nylon, polyester, asphaltic adhesive and mixtures thereof.

43. The roofing system according to claim 42 wherein said coating is from 84% to 96% filler selected from the group consisting of fly ash, charged calcium carbonate, ceramic microspheres and mixtures thereof and from 16% to 4% acrylic latex binder material.

44. The roofing system of claim 34 wherein said interply material is comprised of a roll roofing product comprising a fiberglass substrate coated with asphaltic material and mineral granules.

45. The roofing system of claim 34 wherein said interply material is comprised of asphalt impregnated felt underlayment material.

46. A roofing system comprising:
a) a roof deck of a building;
b) a first layer of underlayment material attached to said roof deck, wherein said material is comprised of a substrate having an ionic charge coated with a coating having essentially the same ionic charge wherein said coating consists essentially of a filler material and a binder material and wherein said binder material bonds the filler material together and to the substrate and wherein said coating does not bleed through said substrate;
c) a second layer of said underlayment material attached to said first layer; and
d) a multiplicity of courses of roofing shingles attached to said second layer of underlayment material.

47. The roofing system according to claim 46 wherein said underlayment material is from 10% to 25% by weight of glass of fibers and said coating is from 84% to 96% filler selected from the group consisting of fly ash, charged calcium carbonate, ceramic microspheres and mixtures thereof, and from 16% to 4% acrylic latex binder material.

48. The roofing system according to claim 46 wherein said underlayment material is comprised of a substrate having an ionic charge,
  (a) coated on one side with a coating having essentially the same ionic charge wherein said coating consists essentially of a filler material and a binder material and wherein said binder material bonds the filler material together and to the substrate and wherein said coating does not bleed through said substrate; and
  (b) covered on the other side with a water vapor impermeable material selected from the group consisting essentially of metal foils and preformed plastic films;
  wherein said water vapor impermeable material is attached to said coated substrate with an adhesive.

49. The roofing system according to claim 46 wherein said underlayment material is comprised of a substrate having an ionic charge coated on both sides with a coating having essentially the same ionic charge wherein said coating consists essentially of a filler material and a binder material and wherein said binder material bonds the filler material together and to the substrate and wherein said coating does not bleed through said substrate;
  wherein one side of said coated substrate is covered with a water vapor impermeable material selected from the group consisting essentially of metal foils and preformed plastic films; and
  wherein said water vapor impermeable material is attached to said coated substrate with an adhesive.

50. The roofing system according to claim 49 wherein one side of said coated substrate is covered with a metal foil water vapor barrier material and the other side of said coated substrate is covered with a preformed plastic film water vapor impermeable material; and wherein both water vapor impermeable materials are attached to said coated substrate with an adhesive.

51. The roofing system according to claim 49 wherein both sides of the coated substrate are coated with a metal foil water vapor impermeable material and wherein said water vapor impermeable material is attached to said coated substrate with an adhesive.

52. The roofing system according to claim 49 wherein both sides of the coated substrate are coated with a preformed plastic film water vapor impermeable material and wherein said water vapor impermeable material is attached to said coated substrate with an adhesive.

53. The roofing system according to claims 48, 49, 50, 51, or 52 wherein said adhesive is selected from the group consisting essentially of low density polyethylene, high density polyethylene, polyethylene-vinyl acetate, polypropylene, polyvinylidene chloride, nylon, polyester, asphaltic adhesive and mixtures thereof.

54. The roofing system according to claim 53 wherein said coating is from 84% to 96% filler selected from the group consisting of fly ash, charged calcium carbonate, ceramic microspheres and mixtures thereof and from 16% to 4% acrylic latex binder material.

55. A laminated roofing shingle for installation on a roof in multiple courses comprising:
  a first shingle sheet having a headlap section that is covered when the shingle is installed with an overlapping shingle course above and a buttlap section that is exposed when the shingle is installed with an overlapping shingle course above, the buttlap section being at least about 60% of the width of the shingle, the first shingle sheet including a plurality of tabs having a length measured in the direction of the width of the shingle which are spaced apart to define one or more openings between said tabs, each of said tabs having a relatively uniform color throughout the tab, and the length of at least one tab being at least about 60% of the width of the shingle;
  a second shingle sheet attached to the underside of said first shingle sheet and having portions exposed through said openings between said tabs; said second shingle sheet having at least first, second, and third horizontal striations thereon across at least partial portions of said second sheet which are exposed through said openings between said tabs;
  said first striation comprising a first elongated quadrilateral area, said first striation having a substantially uniform dark color throughout said first quadrilateral area;
  said second striation comprising a second elongated quadrilateral area below said first striation, said second striation having a substantially uniform color throughout said second quadrilateral area, said color of said second striation being lighter than said color of said first striation; and
  said third striation comprising a third elongated quadrilateral area below said second striation, said third striation having a substantially uniform color throughout said third quadrilateral area, said color of said third striation being lighter than said color of said second striation; whereby at least said second and third striations provide a color gradation on at least partial portions of said second sheet which are exposed through said openings between said tabs.

56. The laminated roofing shingle of claim 55, wherein the second shingle sheet further comprises at least a fourth horizontal striation thereon across at least partial portions of said second sheet which are exposed through said openings between said tabs, the fourth striation comprising a fourth elongated quadrilateral area below said third striation, said fourth striation having a substantially uniform color throughout said fourth quadrilateral area, said color of said fourth striation being lighter than said color of said third striation; whereby at least said second, third, and fourth striations provide a color gradation on at least partial portions of said second sheet which are exposed through said openings between said tabs.

57. The laminated roofing shingle of claims 55 or 56 wherein the width of each of said striations is approximately equal.

58. The laminated roofing shingle of claims 55 or 56 wherein the widths of the first and third striations are approximately equal and are approximately one-half the width of the second striation.

59. The laminated roofing shingle of claims 55 or 56 wherein the widths of the first and third striations are approximately equal and are substantially wider than the width of the second striation.

60. The laminated roofing shingle of claims 55 or 56 wherein said third striation is substantially wider than said second striation and said first striation is approximately twice the width of said third striation.

61. The laminated roofing shingle of claims 55 or 56 wherein the width of the exposed buttlap section is at least about 70% of the width of the shingle.

62. The laminated roofing shingle of claims 55 or 56 wherein the width of the exposed buttlap section is at least about 80% of the width of the shingle.

63. The laminated roofing shingle of claims 55 or 56 wherein the shingle has an exposure width of at least about 64% of the width of the shingle.

64. The laminated roofing shingle of claim 55 wherein each of said tabs have different color contrasts from one another.

65. The laminated roofing shingle of claim 55 wherein the dimensions of one of said tabs differ from the dimensions of others of said tabs.

66. A laminated roofing shingle for installation on a roof in multiple courses comprising:

a first shingle sheet having a headlap section that is covered and a buttlap section that is exposed when the shingle is installed with an overlapping shingle course above, the buttlap section including a plurality of tabs having a length measured in the direction of the width of the shingle which are spaced apart to define one or more openings between said tabs, each of said tabs having a relatively uniform color throughout the tab, wherein the width of the exposed buttlap section is at least about 60% of the width of the shingle, and the length of at least one tab is at least about 60% of the width of the shingle; and a second shingle sheet attached to the underside of said first shingle sheet and having varying portions exposed through said openings between said tabs.

67. The roofing shingle of claim 66 wherein the width of the exposed buttlap section of the shingle is at least about 70% of the width of the shingle.

68. The roofing shingle of claim 66 wherein the width of the exposed buttlap section of the shingle is at least about 80% of width of the roofing shingle.

69. The roofing shingle of claim 66 wherein the shingle has an exposure width of at least about 64% of the width of the shingle.

70. A three tab roofing shingle for installation on a roof in multiple courses, the shingle having an exposure width of at least about 60% of the width of the shingle when installed with an overlapping shingle course above.

71. The shingle of claim 70 wherein the shingle has an exposure width of at least about 64% of the width of the shingle.

* * * * *